US012561939B2

(12) United States Patent
Russell et al.

(10) Patent No.: US 12,561,939 B2
(45) Date of Patent: Feb. 24, 2026

(54) REMOVING ARTIFACTS USING DITHERING COMPENSATION IN IMAGE STREAMING SYSTEMS AND APPLICATIONS

(71) Applicant: NVIDIA Corporation, Santa Clara, CA (US)

(72) Inventors: Andrew Russell, Weston, FL (US); Prabindh Sundareson, Karnataka (IN)

(73) Assignee: NVIDIA Corporation, Santa Clara, CA (US)

( * ) Notice: Subject to any disclaimer, the term of this patent is extended or adjusted under 35 U.S.C. 154(b) by 478 days.

(21) Appl. No.: 18/151,653

(22) Filed: Jan. 9, 2023

(65) Prior Publication Data

US 2024/0233315 A1 Jul. 11, 2024

(51) Int. Cl.
*G06K 9/00* (2022.01)
*G06T 3/4053* (2024.01)
*G06T 7/13* (2017.01)
*G06T 7/90* (2017.01)
*G06V 10/56* (2022.01)

(52) U.S. Cl.
CPC ............ *G06V 10/56* (2022.01); *G06T 3/4053* (2013.01); *G06T 7/13* (2017.01); *G06T 7/90* (2017.01); *G06T 2207/10024* (2013.01)

(58) Field of Classification Search
CPC ...... G06V 10/56; G06V 10/247; G06V 10/30; G06V 30/1607; G06V 30/164; G06V 30/18105; G06T 3/4053; G06T 7/13; G06T 7/90; G06T 2207/10024; G06T 30/164; G06T 11/001; G06T 2207/20182; G06T 2207/20204; G06T 5/002; G06T 5/005; G06T 5/006; G05T 5/70
See application file for complete search history.

(56) References Cited

U.S. PATENT DOCUMENTS

| | | | |
|---|---|---|---|
| 7,903,312 B2 | 3/2011 | Tanaka | |
| 8,732,796 B1 | 5/2014 | Atieh et al. | |
| 9,047,085 B2 | 6/2015 | Wyatt et al. | |
| 9,837,030 B2 | 12/2017 | Verbeure | |
| 10,741,114 B2 | 8/2020 | Park | |
| 10,956,770 B1 * | 3/2021 | Lerner ..................... | G09G 5/14 |
| 2015/0063718 A1 * | 3/2015 | Mantzel ................... | G06T 5/50 |
| | | | 382/274 |
| 2019/0108622 A1 * | 4/2019 | Douady-Pleven ........ | G06T 5/50 |
| 2019/0266935 A1 | 8/2019 | Roever et al. | |

* cited by examiner

*Primary Examiner* — Duy M Dang
(74) *Attorney, Agent, or Firm* — Iron Summit IP LLP

(57) ABSTRACT

In various examples, processing pipelines for removing artifacts from images are described herein. Systems and methods are disclosed that use one or more multi-pass techniques to identify and process areas in an image that have artifacts. For instance, using a series of forward passes, the image is processed to generate multiple levels of images, where the levels of images are used to identify at least areas of the original image that include artifacts and areas of the original image that include true color edges. Next, using a series of backward passes, processing is performed on color values associated with the areas that include artifacts to determine new color values for the pixels within the areas. In some examples, dithering may then be performed on the new color values to distribute errors in quantization across the pixels and remove the artifacts.

20 Claims, 13 Drawing Sheets

IMAGE
202

BACKGROUND
210

ARTIFACT
204(1)

EDGE
206(2)

EDGE
206(3)

EDGE
206(1)

OBJECT
208

ARTIFACT
204(2)

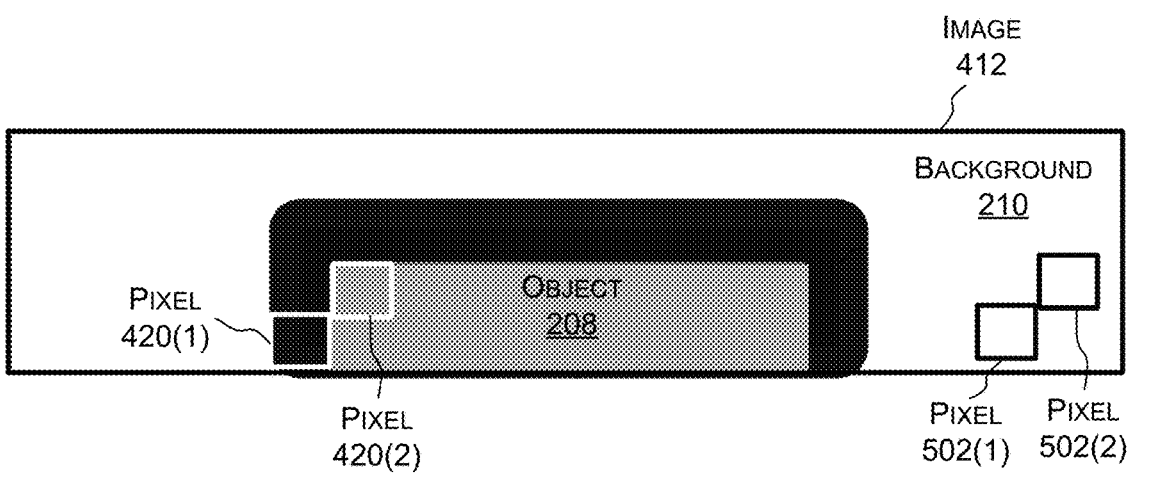
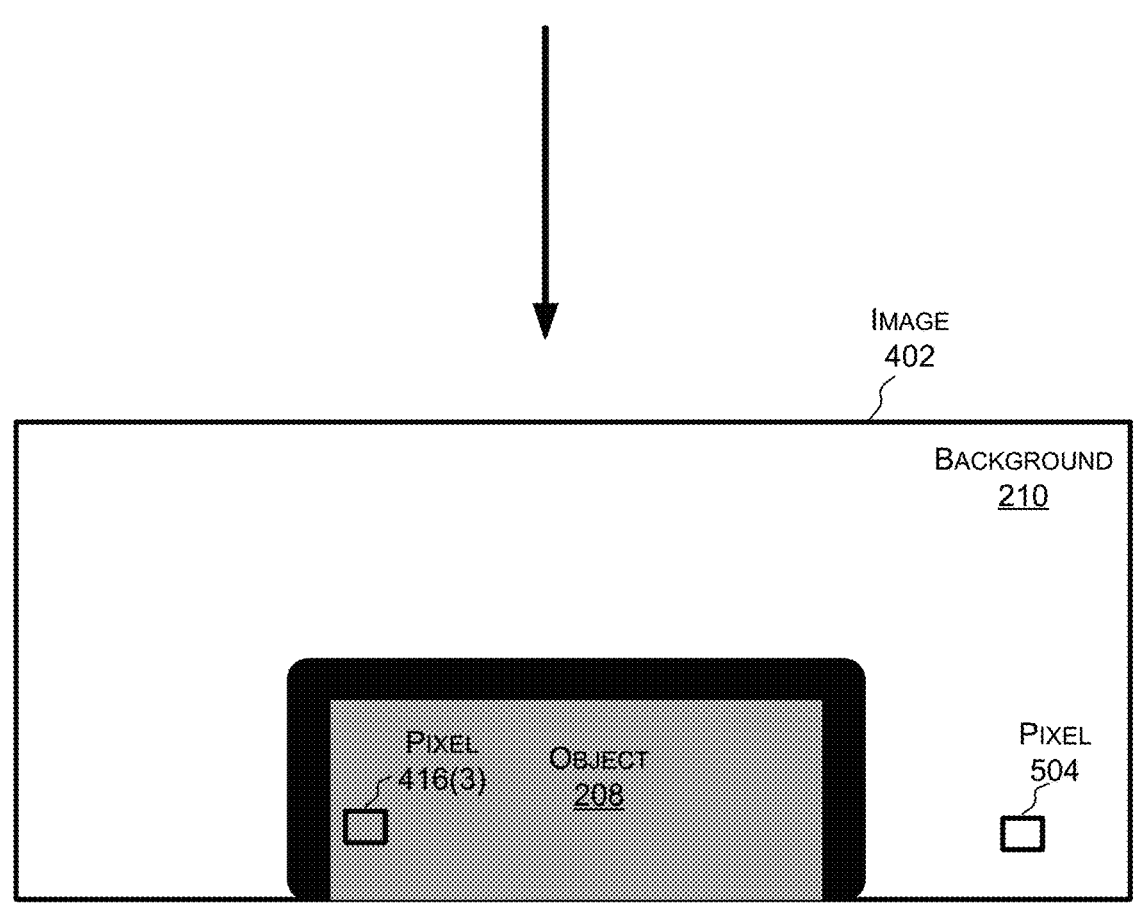
FIGURE 5A

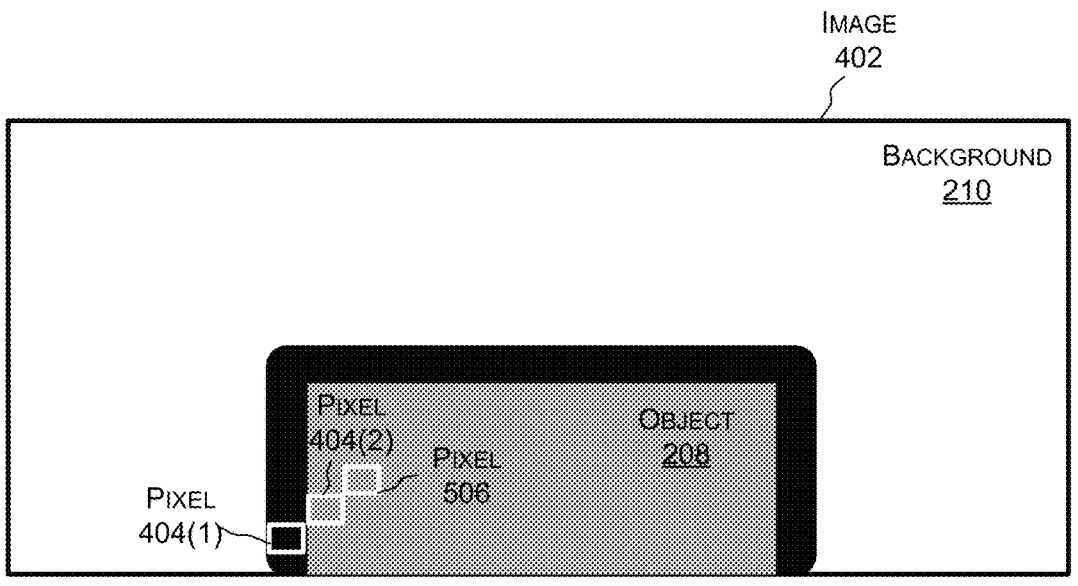
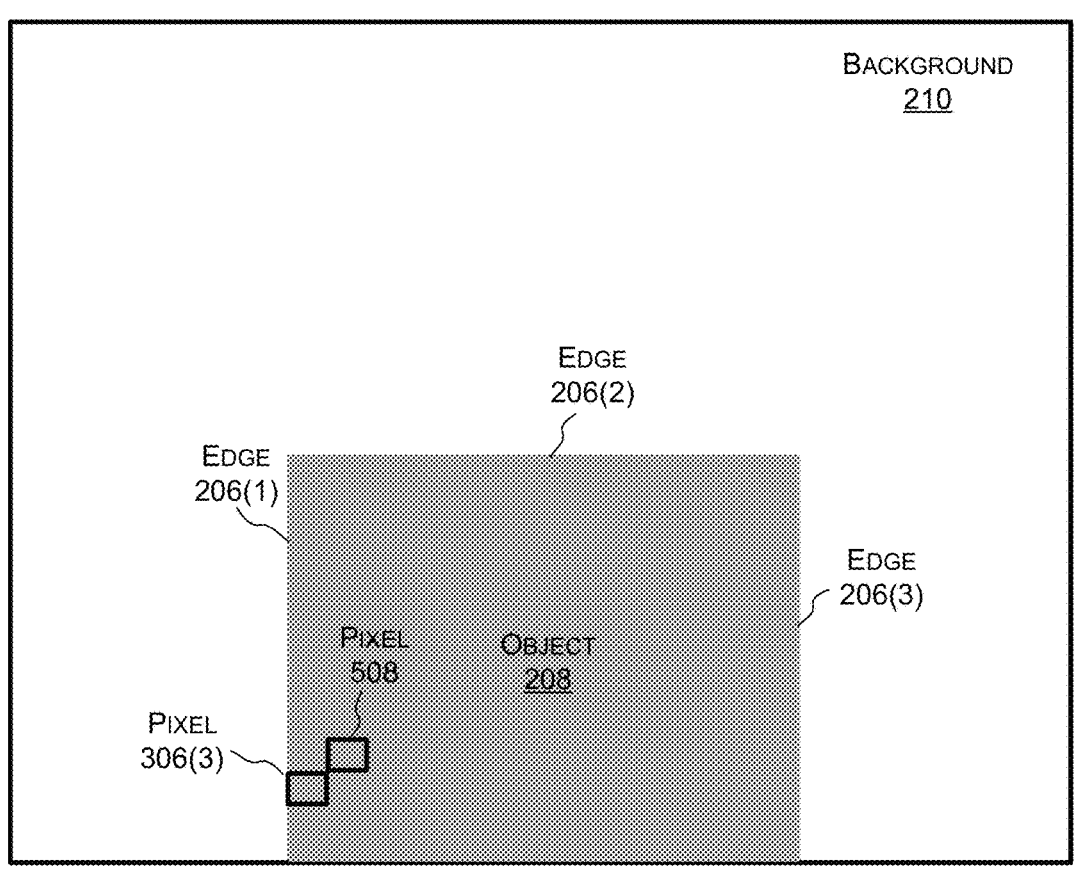
FIGURE 5B

600

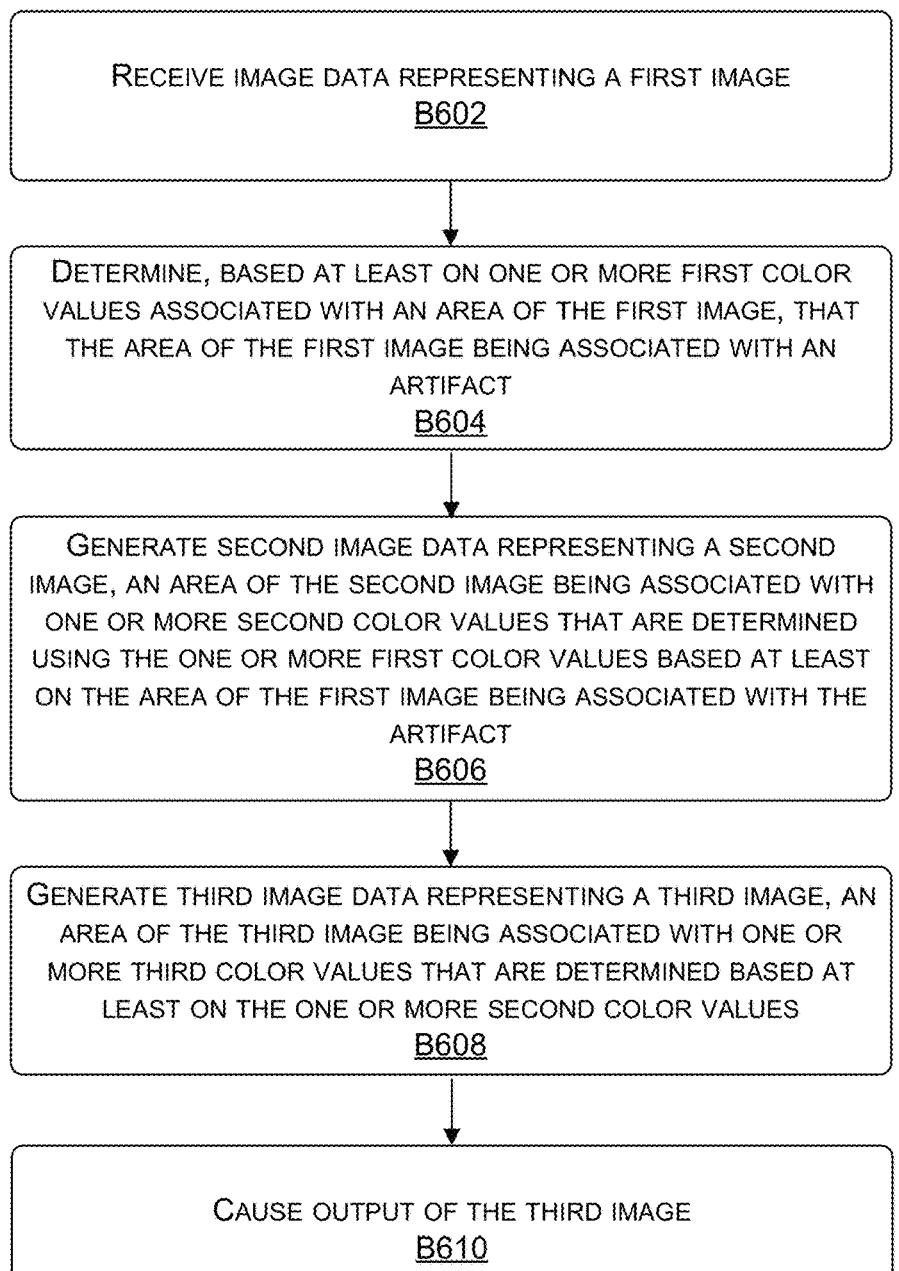

RECEIVE IMAGE DATA REPRESENTING A FIRST IMAGE
B602

DETERMINE, BASED AT LEAST ON ONE OR MORE FIRST COLOR VALUES ASSOCIATED WITH AN AREA OF THE FIRST IMAGE, THAT THE AREA OF THE FIRST IMAGE BEING ASSOCIATED WITH AN ARTIFACT
B604

GENERATE SECOND IMAGE DATA REPRESENTING A SECOND IMAGE, AN AREA OF THE SECOND IMAGE BEING ASSOCIATED WITH ONE OR MORE SECOND COLOR VALUES THAT ARE DETERMINED USING THE ONE OR MORE FIRST COLOR VALUES BASED AT LEAST ON THE AREA OF THE FIRST IMAGE BEING ASSOCIATED WITH THE ARTIFACT
B606

GENERATE THIRD IMAGE DATA REPRESENTING A THIRD IMAGE, AN AREA OF THE THIRD IMAGE BEING ASSOCIATED WITH ONE OR MORE THIRD COLOR VALUES THAT ARE DETERMINED BASED AT LEAST ON THE ONE OR MORE SECOND COLOR VALUES
B608

CAUSE OUTPUT OF THE THIRD IMAGE
B610

FIGURE 6

700

IDENTIFY PIXELS ASSOCIATED WITH AN AREA OF A FIRST IMAGE
B702

DETERMINE COLOR VALUES ASSOCIATED WITH THE PIXELS
B704

DETERMINE A COLOR RANGE VALUE ASSOCIATED WITH THE COLOR VALUES
B706

IS THE COLOR RANGE VALUE LESS THAN A THRESHOLD COLOR VALUE
B708

YES

NO

DETERMINE THE AREA IS ASSOCIATED WITH AN ARTIFACT
B710

DETERMINE THE AREA IS ASSOCIATED WITH A TRUE COLOR EDGE
B714

DETERMINE A PIXEL VALUE FOR A PIXEL OF A SECOND IMAGE BASED AT LEAST ON THE PIXEL VALUES
B712

DETERMINE THE PIXEL VALUE FOR THE PIXEL OF THE SECOND IMAGE AS A MARKER PIXEL VALUE
B716

IDENTIFY PIXELS ASSOCIATED WITH A FIRST IMAGE
B802

DETERMINE FIRST COLOR VALUES ASSOCIATED WITH THE PIXELS
B804

IS ONE OF THE FIRST COLOR VALUES A MARKER COLOR VALUE
B806

NO

YES

DETERMINE A COLOR VALUE FOR A PIXEL OF A SECOND IMAGE BASED AT LEAST ON THE FIRST COLOR VALUES
B808

DETERMINE ONE OR MORE SECOND COLOR VALUES
B810

DETERMINE THE COLOR VALUE FOR THE PIXEL OF THE SECOND IMAGE BASED AT LEAST ON THE ONE OR MORE SECOND COLOR VALUES
B812

REMOVING ARTIFACTS USING DITHERING COMPENSATION IN IMAGE STREAMING SYSTEMS AND APPLICATIONS

BACKGROUND

Images are often stored or transmitted using color values associated with the pixels, where the respective color value for each pixel is represented by one or more bits. Because of this, the number of colors that may be utilized to represent a single pixel is a function of the number of bits used to describe the color. For example, increasing the number of bits used to represent the colors may also increase the number of colors represented by the images. However, even when using an increased number of bits to represent the colors, visual artifacts may still be noticeable as a result of the limited number of color values that represent the pixels. For instance, a visual artifact that is common and noticeable is referred to as "banding" or "false contouring," which occurs when a portion of an image that is supposed to include a smooth transition between colors, such as a color gradient, instead shows noticeable borders between the colors. Such artifacts may be more noticeable in certain images, such as images that includes dark backgrounds.

Some techniques have been used to remove these types of artifacts from images. For instance, dithering is a step in a processing pipeline that adds a small random noise to the pixel values of the image, such as where one of these artifacts is present. This small random noise improves the visual quality of the image by distributing errors in quantization across the pixels. However, in circumstances where the images are then processed for sending to one or more remote devices, such as when streaming a video (e.g., a game stream) to a remote device that is to display the images, the processing may remove the effects of the dithering. For example, during the compression process of the images, the effects of dithering may be disturbed due to the data-reduction action of a video compressor. When the images are subsequently displayed on the remote device, the same artifacts that were originally removed through dithering may once again be present in the images.

SUMMARY

Embodiments of the present disclosure relate to processing pipelines for removing artifacts from images. Systems and methods are disclosed that use one or more multi-pass techniques to identify and process areas in an image that have artifacts. For instance, using a series of forward passes, the image is processed to generate multiple levels of images, where the levels of images are used to identify at least areas of the original image that include artifacts and areas of the original image that include true color edges. Next, using a series of backward passes, processing is performed on color values associated with the areas that include artifacts to determine new color values for the pixels within the areas. In some examples, dithering may then be performed on the new color values to distribute errors in quantization across the pixels and remove the artifacts. These processes may be performed to remove artifacts in multiple images, such as images that are associated with a game stream.

In contrast to conventional systems, such as those described above, one or more embodiments of the present disclosure process the images to remove artifacts using a client device that is streaming the images for display. This provides improvements over the conventional systems that process images using dithering, since the conventional systems may eliminate the effects of the dithering when compressing the images before sending to client devices. Additionally, one or more embodiments of the present disclosure are able to improve dithering using the multi-pass techniques that identify and process areas of the images that have artifacts. For instance, the multi-pass techniques allow for customizing parameters, such as the number of passes used to process the images and/or the threshold color values used to identify artifacts. Allowing the parameters to be customized may improve the processing when events occur, such as by allowing changes in the bitrate and/or network bandwidth used to transmit the images.

BRIEF DESCRIPTION OF THE DRAWINGS

The present systems and methods for processing pipelines that remove artifacts from images are described in detail below with reference to the attached drawing figures, wherein:

FIGS. 5A-5B illustrate examples of sampling images to correct artifacts during backward passes, in accordance with some embodiments of the present disclosure;

FIG. 6 is a flow diagram showing a method for processing an image to remove an artifact, in accordance with some embodiments of the present disclosure;

FIG. 7 is a flow diagram showing a method for sampling an area of an image during a forward pass to identify an artifact, in accordance with some embodiments of the present disclosure;

FIG. 8 is a flow diagram showing a method for sampling an area of an image during a backward pass to correct an artifact, in accordance with some embodiments of the present disclosure;

DETAILED DESCRIPTION

Figure 1:
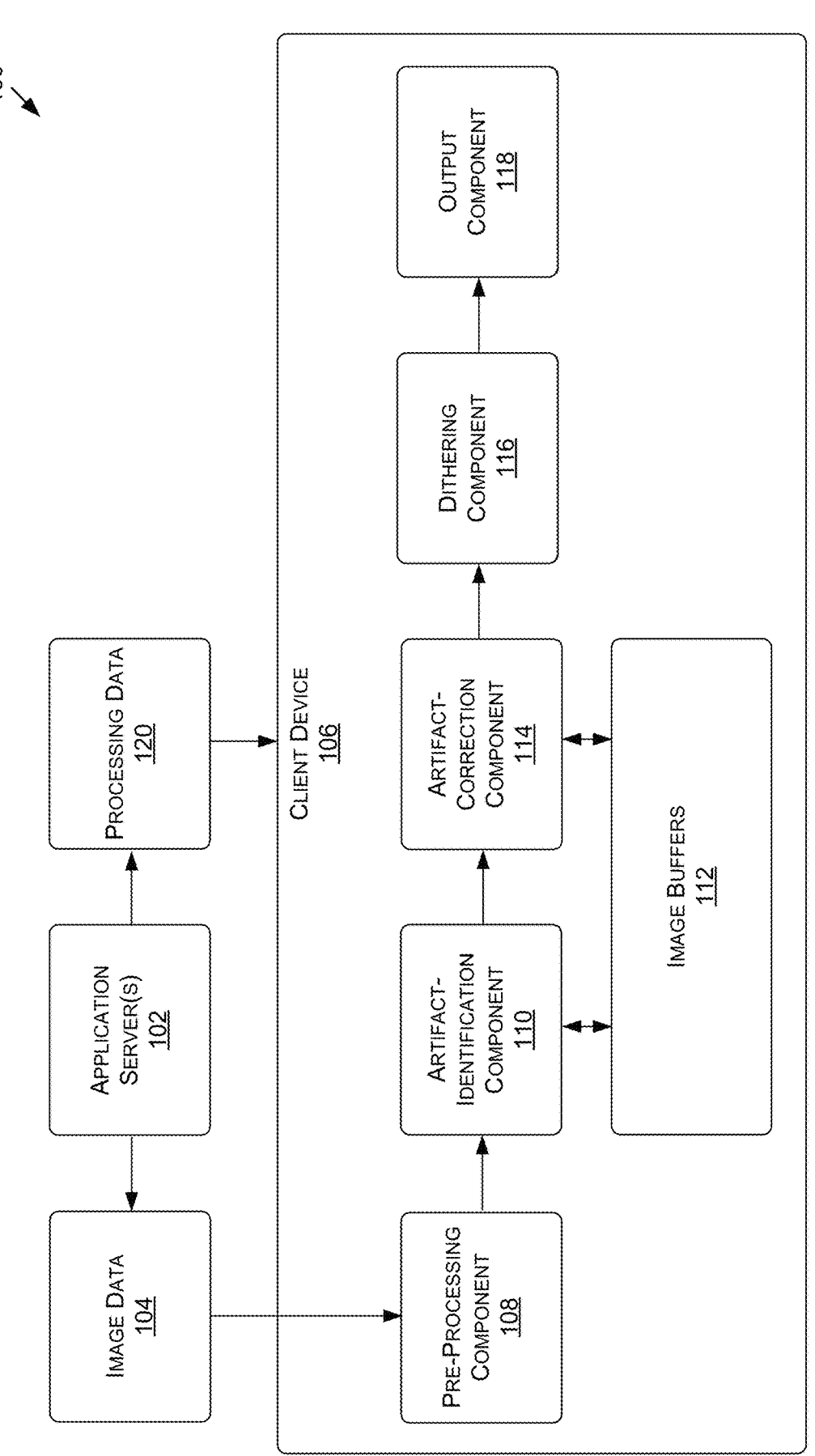
FIG. 1 illustrates an example data flow diagram for a process of removing artifacts from images, in accordance with some embodiments of the present disclosure.

Systems and methods are disclosed related to processing pipelines for removing artifacts from images. Disclosed embodiments may be comprised in a variety of different systems such as streaming systems (e.g., game streaming systems), automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for processing data, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

For instance, a client device may receive image data representing one or more images from a system(s), such as from a remote system(s) via a network. In some examples, the system(s) may process the image data using one or more techniques before sending the image data to the client device. For instance, and as described herein, the system(s) may process the image data using one or more dithering techniques to remove artifacts, such as "banding" or "false contouring," from the image(s). The system(s) may also process the image data using one or more compression techniques (e.g., where the image data represents compressed image data). However, as described herein, in some examples, the system(s) may remove the effects of dithering by processing the image data using the compression technique(s).

The client device may initially process the image data using one or more decompression techniques. The image data may represent color values associated with the pixels of the image(s), where a color value defines a color for a respective pixel when the pixel is output for display. The color values may be defined using one or more components associated with a color space. For instance, in some examples, the color values may be defined using the red-green-blue (RGB) color space, such that a color value includes a red component (e.g., between 0 and 255), a green component (e.g., between 0 and 255), and a blue component (e.g., between 0 and 255). In some examples, the color values may be defined using the YUV color space, such that a color value includes a luminance component and two chrominance components (e.g., a blue projection and a red projection). Still, in some examples, the color values may be defined using other color spaces, such as, but not limited to, the Hue, Saturation, and Lightness (HSV) color space, the Hue, Saturation, and Luminance (HSL) color space, and/or the like.

The client device may then use one or more multi-pass techniques to identify and process areas in an image that have artifacts. For instance, the client device may perform a series of forward passes that operate using a set of images buffers. The series of forward passes may include, but is not limited to, one forward pass, two forward passes, five forward passes, eight forward passes, ten forward passes, and/or any other number of forward passes. In some examples, the set of image buffers have the same width as the original image, but the heights of the image buffers may change based on where in the series of forward passes the image buffer is associated. For example, the first image buffer (e.g., the input image buffer) associated with the original image may include a first height, the second image buffer (e.g., a first working buffer) associated with the first forward pass may include a second height that is less than (e.g., half of) the first height, the third image buffer (e.g., a second working buffer) that is associated with the second forward pass may include a third height that is less than (e.g., half of) the second height, the fourth image buffer (e.g., a third working buffer) that is associated with the third forward pass may include a fourth height that is less than (e.g., half of) the third height, and/or so forth.

For the first forward pass, the client device may sample the original image using a number of points, such as four points. For example, four pixels located proximate to one another (e.g., four corners of a square) may be sampled to determine a respective color value (e.g., a RGB color value, a YUV color value, etc.) associated with each pixel. The color values may then be analyzed to determine a range of the color values, such as by taking a difference between the lowest color value and the highest color value from the sample. Using the range, a determination may be made as to whether an area of the image associated with the pixels is associated with an artifact or a true color "edge" of the image. For example, the area of the image may be associated with an artifact when the range is less than a threshold color value and be associated with a true color edge when the range is equal to or greater than the threshold color value. The client device may then perform various processes based on whether the area is associated with an artifact or a true color edge.

For instance, if the area is associated with an artifact, then the client device may use the color values for the pixels to determine a new color value for a pixel in a first processed image associated with the second image buffer (e.g., the first working buffer). In some examples, the client device determines the new color value as the average of the color values for the pixels. Alternatively, if the area is associated with a true color edge, then the client device may determine the color value for the pixel in the first processed image as a set color value. In some examples, the set color value may include a marker value, such as a negative value (e.g., −2.0). The client device may then perform similar processes for additional pixel groups associated with the image.

For example, the client device may perform these processes such that each pixel in the original image is sampled twice (e.g., each pixel is included in two different groups of four pixels). By sampling each pixel in the original image twice, the first processed image associated with the second image buffer (e.g., the first working buffer) may be half of the original image (e.g., include a same width, but half of the height). The client device may then perform similar processes when processing the first processed image to generate a second processed image associated with the third image buffer (e.g., the second working buffer), when processing the second processed image to generate a third processed image associated with the fourth image buffer (e.g., the third working buffer), and/or so forth. In some examples, since each processed image is smaller than the previous process image, the areas of the samples increase with each forward pass (e.g., each forward pass may double the width of the areas horizontally). This way, the client device may ensure that an entire height of the image is processed to identify artifacts.

The client device may then perform a series of backward passes that operate using a set of images buffers. The series of backward passes may include a same number of passes as the series of forward passes such as, but not limited to, one backward pass, two backward passes, five backward passes, eight backward passes, ten backward passes, and/or any other number of backward passes. In some examples, the set of image buffers have the same width as the original image, but the heights of the image buffers may change based on where in the series of backward passes the image buffer is associated. For example, the first image buffer (e.g., the last working buffer) associated with the first backward pass may include a first height, the second image buffer (e.g., the second to last working buffer) associated with the second backward pass may include a second height that is greater than (e.g., double) the first height, the third image buffer (e.g., the third to last working buffer) that is associated with the third backward pass may include a third height that is greater than (e.g., double) the second height, and/or so forth to the last image buffer that is associated and/or includes a same size as the original image. In some examples, the image buffers associated with the forward passes are the same as the image buffers associated with the backward passes. In other examples, the image buffers associated with the forward passes are different than the image buffers associated with the backward passes.

For a backward pass, the client device may sample a number of points of a processed image, such as two points. For example, and as described above, each pixel of a processed image during a forward pass may be sampled twice to determine color values for two pixels in the next processed image. As such, in the backward pass, the same two pixels that were determined for the forward pass may be sampled to determine a new color value for the pixel in the processed image. To determine the color value, if the two pixels are not associated with a marker value, then the color values for the two pixels are used to determine the new color value for the pixel in the other image. In some examples, the new color value is determined by averaging the two color values. However, if at least one of the two pixels is associated with a marker value, then the original color value for that pixel(s) in the other image is used to determine the new color value. For instance, the new color value may again be determined by averaging the original color value of the pixel that is associated with the marker value and the color value of the other pixel in the sample. The client device may then perform similar processes for additional pixel groups.

The final result may include color values for the pixels associated with the original image. In some examples, such as in areas where artifacts were identified, the color values may be different than the original color values for the image. In some examples, such as in areas where true color edges where identified, the color values may be the same and/or substantially the same as the original color values for the image. The client device may then perform one or more additional image processing steps to determine the final color values for the pixels of the image. For example, since one or more of the color values may be associated with a fraction, the client device may process the color values using one or more dithering techniques. The client device may then perform similar processes to process one or more (each or) the other images for display.

With reference to FIG. 1, FIG. 1 illustrates an example data flow diagram for a process 100 of removing artifacts from images, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include an application server(s) 102 (which may include, and/or represent, an application server (s) 902) sending image data 104 to a client device 106 (which may include, and/or represent, a client device 904). As described herein, the image data 104 may represent one or more images, such as a stream of images associated with a game, a show, a movie, and/or the like. Additionally, the image data 104 may represent color values associated with the pixels of the image(s), where a color value defines a color for a respective pixel when the pixel is output for display. The color values may be defined using multiple components. For instance, in some examples, the color values may be defined using the RGB color space, such that a color value includes a red component (e.g., between 0 and 255), a green component (e.g., between 0 and 255), and a blue component (e.g., between 0 and 255). In some examples, the color values may be defined using the YUV color space, such that a color value includes a luminance component and two chrominance components (e.g., a blue projection and a red projection). Still, in some examples, the color values may be defined using other color spaces, such as, but not limited to, the HSV color space, the HSL color space, and/or the like.

The application server(s) 102 may process the image data 104 using one or more techniques before sending the image data 104 to the client device 106. For instance, and as described herein, the application server(s) 102 may process the image data 104 using one or more dithering techniques to remove artifacts, such as "banding" or "false contouring," from the image(s). The application server(s) 102 may also process the image data 104 using one or more compression techniques (e.g., where the image data 104 represents compressed image data 104). However, as described herein, in some examples, the application server(s) 102 may remove the effects of dithering by processing the image data 104 using the compression technique(s). In other words, the image(s) represented by the image data 104 may once again include the artifacts that the dithering was intended to remove.

The client device 106 may then process the image data 104 before displaying the image(s). For instance, the process 100 may include the client device 106 processing the image data 104 using a pre-processing component 108. In some examples, the pre-processing component 108 may decompress the image data 104, which was compressed by the application server(s) 102. In some examples, the pre-processing component 108 may convert the image data 104 from one color space to a second, different color space. For a first example, the pre-processing component 108 may convert the image data 104 from the RGB color space to the YUV color space. For a second example, the pre-processing component 108 may convert the image data from the YUV color space to the RGB color space. In some examples, the pre-processing component 108 may convert the image data 104 to the new color space for the rest of the components to perform the processes described herein (e.g., the rest of the components may be configured to process color values associated with the new color space).

Figure 2:
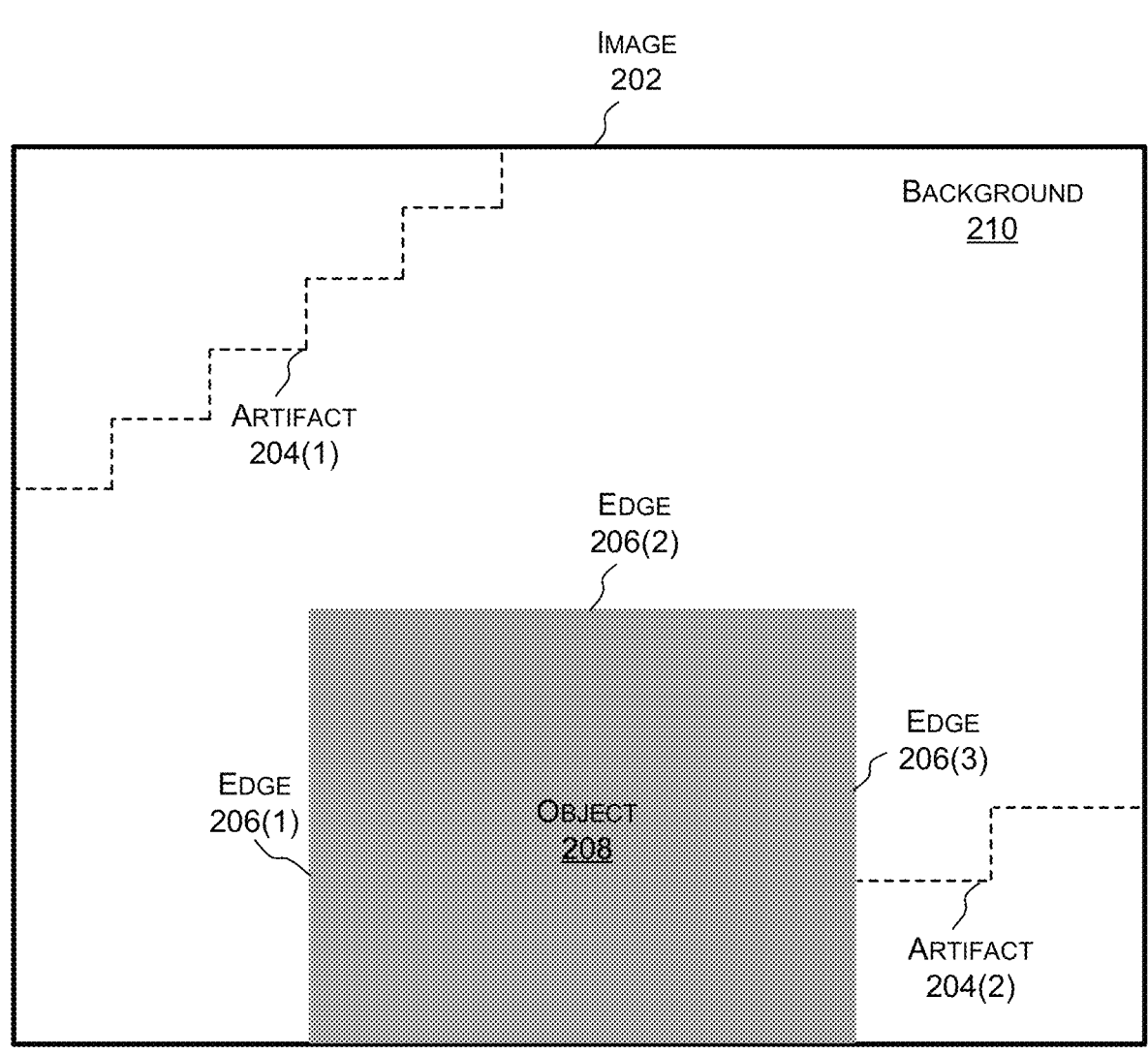
FIG. 2 illustrates an example of an image that includes artifacts and true color edges, in accordance with some embodiments of the present disclosure.

The process 100 may then include an artifact-identification component 110 processing the image data 104 to identify areas within the image(s) that represent artifacts and/or areas within the image(s) that represent true color edges. For instance, FIG. 2 illustrates an example of an image 202, which may be represented by the image data 104, that includes artifacts 204(1)-(2) (also referred to singularly as "artifact 204" or in plural as "artifacts 204") and true color edges 206(1)-(3) (also referred to singularly as "color edge 206" or in plural as "color edges 206"), in accordance with some embodiments of the present disclosure. As shown, the image 202 may depict at least an object 208 and a background 210. The object 208 may be associated with a first color, such as dark grey in the example of FIG. 2, while the background may be associated with a second color, such as white in the example of FIG. 2. As such, since the first color of the object 208 is substantially different than the second color of the background 210, the areas of the image 202 associated with the edges 206 represent true color change. This is because the actual color should change from the first color to the second color in the areas where the edges 206 are located.

The image 202 may also depict artifacts 204, such as "banding" or "false contouring," where the color should remain substantially constant and/or include a color gradient. While the example of FIG. 2 illustrates the artifacts 204 as being located in the background 210 of the image 202, in other examples, artifacts may be located in other areas of the image 202, such as the areas that depict the object 208. Additionally, while the example of FIG. 2 illustrates the artifacts 204 as including a "block" pattern and/or a "stairs" pattern, in other examples, artifacts 204 may include any other pattern.

Referring back to the example of FIG. 1, the artifact-identification component 110 may use a series of forward passes to sample the image(s) to detect the artifacts. For example, artifact-identification component 110 may sample pixels located proximate to one another (e.g., four corners of a square) to determine a respective color value (e.g., a RGB color value, a YUV color value, etc.) associated with each pixel. For instance, the artifact-identification component 110 may sample pixels using the following:

$$\text{(for each } xx, yy, \text{ texture coordinate)}$$

$$\text{int } o = (xx \gg (\text{level} - 1)) \, \&1;$$

$$\text{int } xx1 = xx;$$

$$\text{int } xx2 = xx + (2 \ll (\text{level} - 1));$$

$$\text{int } yy1 = (yy \ll 1) - o;$$

$$\text{int } yy2 = (yy \ll 1) + 1 - o;$$

In the above, the artifact-identification component 110 may sample at (xx1, yy1), (xx2, yy1), (xx2, yy1), and (xx2, yy2).

The artifact-identification component 110 may then analyze the color values to determine a range of the color values, such as by taking a difference between the highest color value and the lowest color value from the sample. Using the range, the artifact-identification component 110 may determine whether an area of the image associated with the pixels represents an artifact or a true color "edge" of the image. For example, the artifact-identification component 110 may determine that the area of the image depicts an artifact when the range is less than a threshold color value and depicts a true color edge when the range is equal to or greater than the threshold color value.

Figure 3:
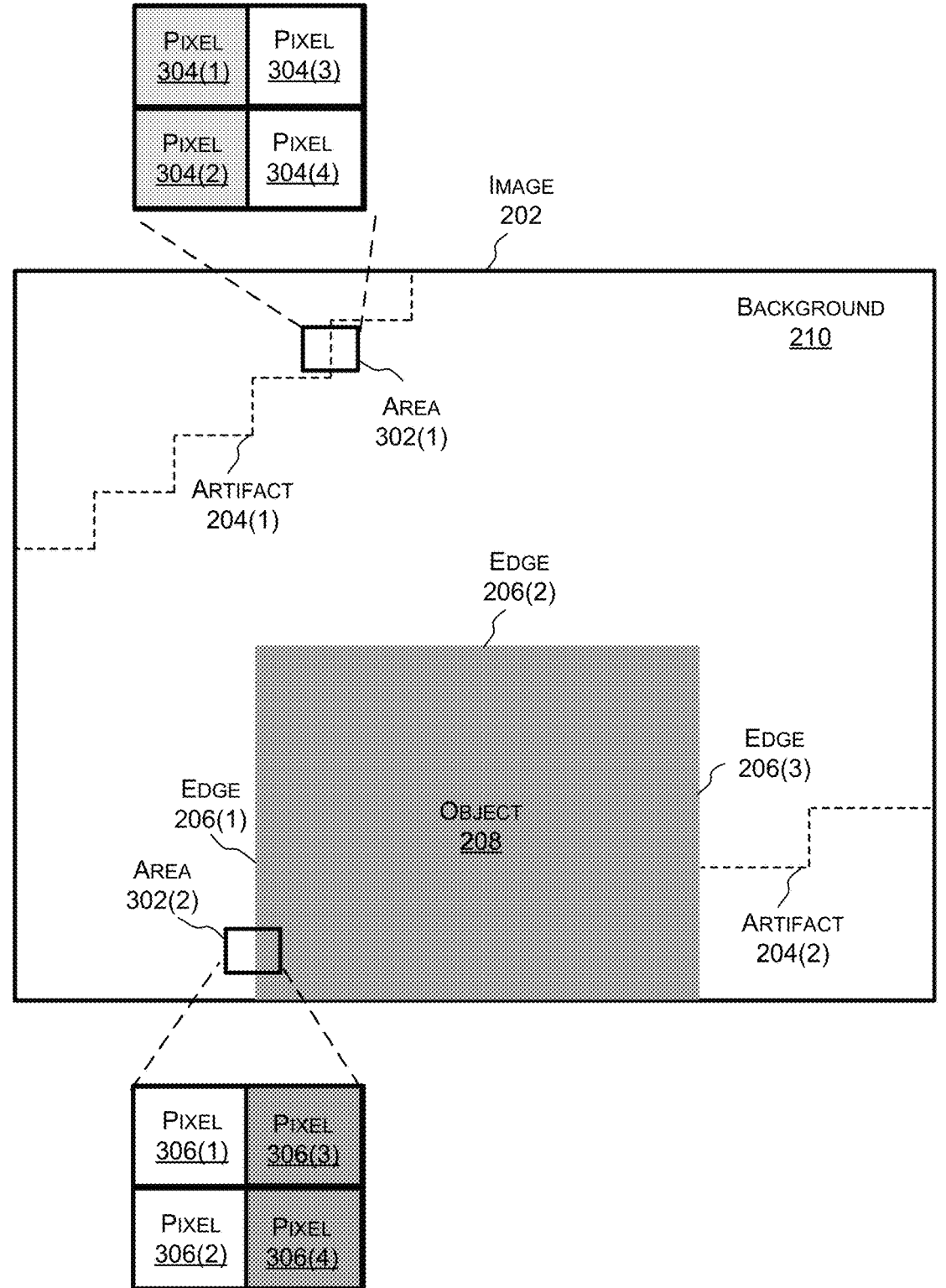
FIG. 3 illustrates an example of sampling areas of an image to determine whether the areas depict an artifact or a true color edge, in accordance with some embodiments of the present disclosure.

For instance, FIG. 3 illustrates an example of sampling areas 302(1)-(2) (also referred to singularly as "area 302" or in plural as "areas 302") of the image 202 to determine whether the areas 302 depict an artifact 204 or a true color edge 206, in accordance with some embodiments of the present disclosure. For example, the artifact-identification component 110 may sample pixels 304(1)-(4) (also referred to singularly as "pixel 304" or in plural as "pixels 304") associated with the area 302(1) of the image 202. Based on the sampling, the artifact-identification component 110 may determine the pixel values associated with the pixels 304. The artifact-identification component 110 may then determine a color range associated with the pixel values. For instance, and in the example of FIG. 3, since the pixels 304(1)-(2) have a slightly different color than the pixels 304(3)-(4), the color range associated with the pixels 304 may be small (e.g., 0.5).

The artifact-identification component 110 may then compare the color range to a threshold color value. As described herein, the threshold color value may include, but is not limited to, 0.5, 1, 2, 5, and/or any other color value. In the example of FIG. 3, the artifact-identification component 110 may determine, based on the comparison, that the color range is less than the threshold color value. As such, the artifact-identification component 110 may determine that the area 302(1) depicts the artifact 204(1).

For another example, the artifact-identification component 110 may sample pixels 306(1)-(4) (also referred to singularly as "pixel 306" or in plural as "pixels 306") associated with the area 302(2) of the image 202. Based on the sampling, the artifact-identification component 110 may determine the pixel values associated with the pixels 306. The artifact-identification component 110 may then determine a color range associated with the pixel values. For instance, and in the example of FIG. 3, since the pixels 306(1)-(2) have a significantly different color than the pixels 306(3)-(4), the color range associated with the pixels 306 may be large (e.g., 5). The artifact-identification component 110 may then compare the color range to the threshold color value. In the example of FIG. 3, the artifact-identification component 110 may determine, based on the comparison, that the color range is equal to or greater than the threshold color value. As such, the artifact-identification component 110 may determine that the area 302(2) depicts a true color edge 206(1).

In some examples, the artifact-identification component 110 may perform similar processes for one or more additional areas of the image 202. For example, the artifact-identification component 110 may perform such processes such that the pixels of the image 202 (e.g., each pixel of the image 202) are sampled at least two times.

While the example of FIG. 3 illustrates the artifact-identification component 110 sampling groups of pixels that include four pixels in a square pattern, in other examples, the artifact-identification component 110 may sample groups of pixels that include any other number of pixels and/or any other shape. For example, and as described in more detail herein, the artifact-identification component 110 may sample pixels in a rectangular pattern. Additionally, while the example of FIG. 3 describes comparing one color range for each sample to one threshold color value, in other examples, multiple color ranges for each sample may be compared to multiple threshold color values.

For example, if the artifact-identification component 110 determines multiple components for the color values of the pixels 304, such as red components, green components, and blue components for the RGB color space, then the artifact-identification component 110 may further determine multiple color ranges, such as a red color range, a green color range, and a blue color range. The artifact-identification component 110 may then compare the color ranges to one or more threshold color values. In some examples, the artifact-identification component 110 may then determine that the area 302(1) is associated with the artifact 204(1) based on at least one of the color ranges being less than a threshold color value. In other examples, the artifact-identification component 110 may determine that the area 302(1) is associated with the artifact 204(1) based on all of the color ranges being less than the threshold color value(s).

Referring back to the example of FIG. 1, the client device 106 may perform these processes using a series of forward passes that operate using a set of images buffers 112. The series of forward passes may include, but is not limited to, one forward pass, two forward passes, five forward passes, eight forward passes, ten forward passes, and/or any other number of forward passes. In some examples, the set of image buffers 112 have the same width as the original image, but the heights of the image buffers may change based on where in the series of forward passes the image buffer 112 is associated. For example, the first image buffer 112 (e.g., an input image buffer) associated with the original image may include a first height, the second image buffer 112 (e.g., a first working buffer) associated with the first forward pass may include a second height that is less than (e.g., half of) the first height, the third image buffer 112 (e.g., a second working buffer) that is associated with the second forward pass may include a third height that is less than (e.g., half of) the second height, the fourth image buffer 112 (e.g., a third working buffer) that is associated with the third forward pass may include a fourth height that is less than (e.g., half of) the third height, and/or so forth.

Figure 4A:
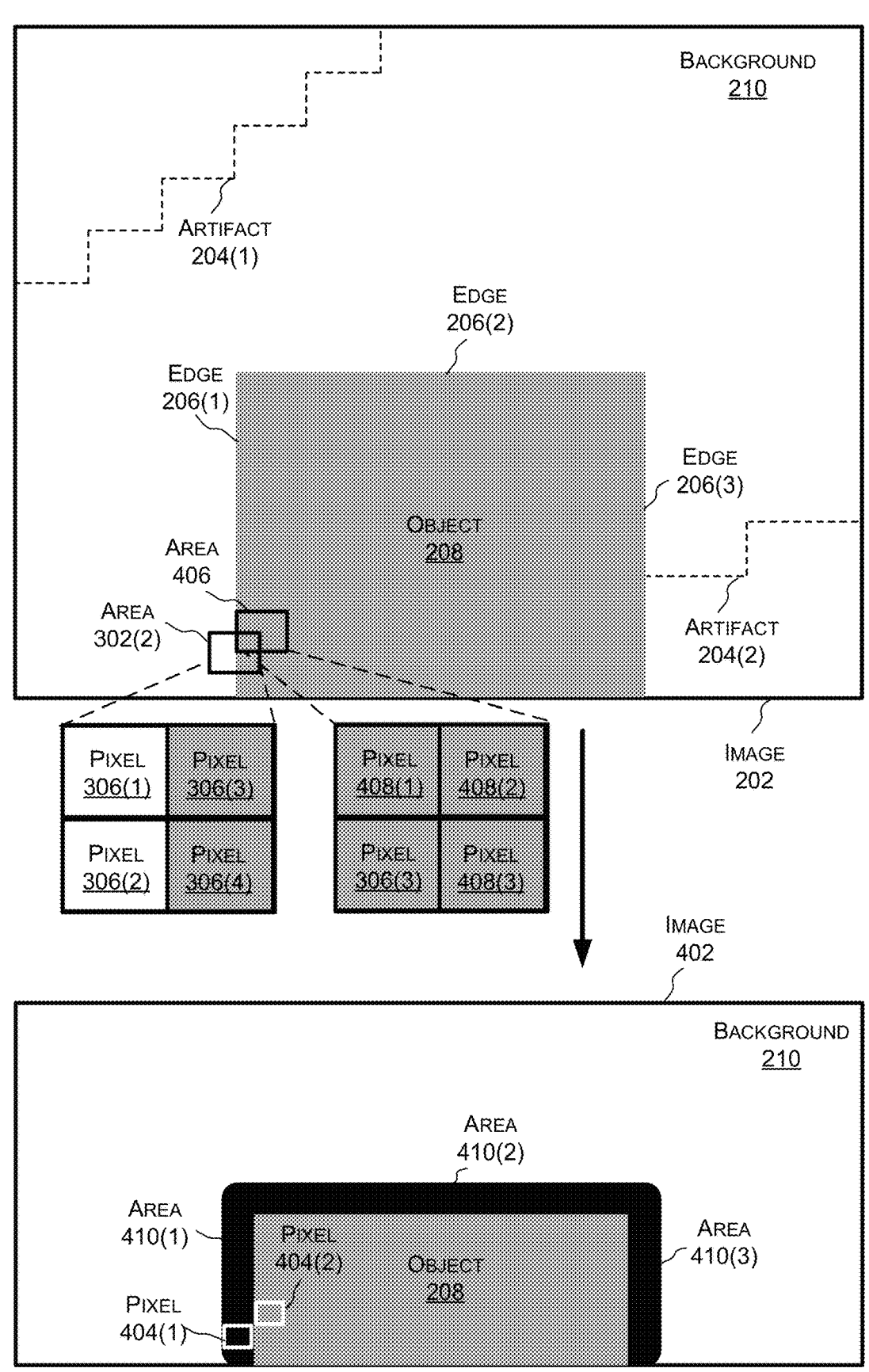
FIGS. 4A-4B illustrate examples of sampling images to identify artifacts during forward passes, in accordance with some embodiments of the present disclosure.

For instance, FIG. 4A illustrates an example of performing a first forward pass, in accordance with some embodiments of the present disclosure. As shown, the artifact-identification component 110 may sample the image 202, which is associated with a first level, using the processes above to generate an image 402, which is associated with a second level. For instance, the artifact-identification component 110 may perform the processes above to determine that the area 302(2) of the image 202 depicts the true color edge 206(1). Based on that determination, the artifact-identification component 110 may determine a color value for a pixel 404(1) associated with the image 402 that corresponds to area 302(2) of the image 202. As described herein, based on the area 302(2) depicting the true color edge 206(1), the artifact-identification component 110 may determine the color value as including a marker value, such as a negative value (e.g., −2.0). Because of this, the pixel 404(1) may include a specific color associated with the marker value. In the example of FIG. 4A, the specific color is black. However, in other examples, the specific color may include any other color (e.g., green, blue, yellow, red, etc.).

The artifact-identification component 110 may also perform similar processes with respect to another area 406 of the image 202. As shown, the area 406 of the image 202 may also include the same pixel 306(3) as the area 302(2), but also includes three additional pixels 408(1)-(3) (also referred to singularly as "pixel 408" or in plural as "pixels 408"). As described above, in some examples, one or more of the pixels of the image 202 (e.g., each pixel of the image 202) may be sampled at least twice during the first forward pass. As such, the sample associated with the area 302(2) includes the pixel 306(3) in a first position, which is the top-right position, and the sample associated with the area 406 includes the pixel 306(3) in a second position, which is the bottom-left position. However, in other examples, the pixel 306(3) may be included in the same position in each sample and/or may be included in other respective position for each sample.

Using the processes described herein, the artifact-identification component 110 may determine that the area 406 represents an artifact. For instance, in some examples, the artifact-identification component 110 may make the determination based on a color range associated with the pixels 306(3) and 408 being less than the threshold color value. The artifact-identification component 110 may then determine a color value for a pixel 404(2) associated with the image 402 that corresponds to area 406 of the image 202. As described herein, since the area 406 depicts an artifact, the artifact-identification component 110 may determine the color value using the color values of the pixels 306(3) and 408. For instance, in some examples, the artifact-identification component 110 may determine that the color value of the pixel 404(2) includes the average of the color values of the pixels 306(3) and 408. However, in other examples, the artifact-identification component 110 may determine the color value of the pixel 404(2) using one or more additional and/or alternative techniques.

The artifact-identification component 110 may then continue to perform these processes of sampling additional areas of the image 202 to generate the image 402. In the example of FIG. 4A, since each of the pixels of the image 202 are sampled twice using groups that include four pixels, the image 402 may be half of the size of the image 202. For instance, as shown, the width of the image 402 is the same as the width of the image 202, but the height of the image 402 is half of the height of the image 202. However, in other examples, the artifact-identification component 110 may sample the image 202 using one or more other processes such that the height of the image 402 is the same as the height of the image 202, but the width of the image 402 is half of the width of the image 202. Additionally, in other examples, the artifact-identification component 110 may sample the image 202 using one or more processes such that the size of the image 402 is 25% of the size of the image 202, 75% of the size of the image 202, and/or any other percentage of the size of the image 202.

By performing the processes described herein, areas 410(1)-(3) of the image 402 that are associated with areas of the image 202 for which the true color edges 206 are located include a specific color (e.g., black in the example of FIG. 4A). Additionally, the remaining areas of the image 402 that are associated with areas of the image 202 that do not include true color edges 206 and/or include artifacts 204 include a color that is based on color values of the pixels of the image 202.

Figure 4B:
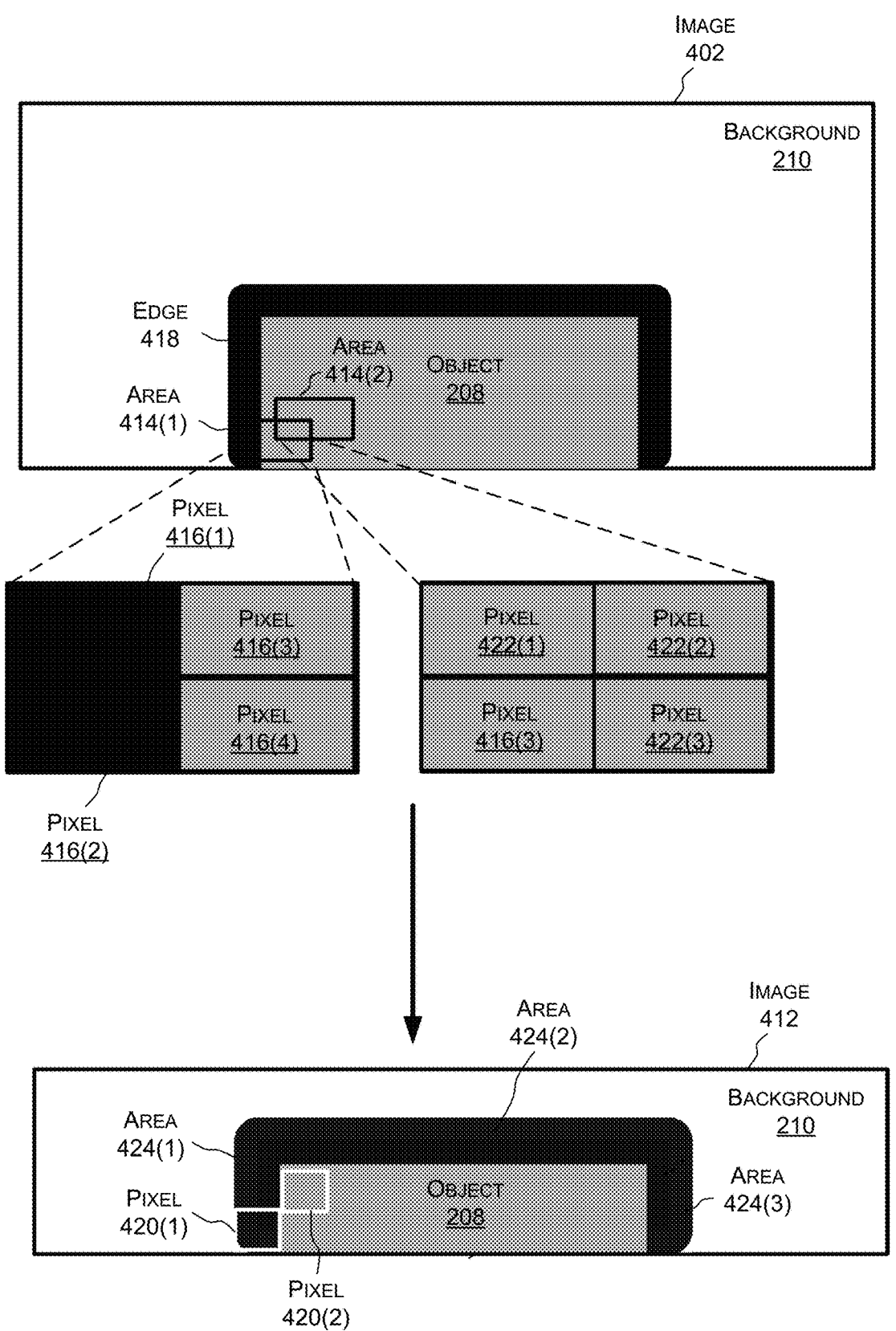

FIG. 4B illustrates an example of performing a second forward pass, in accordance with some embodiments of the present disclosure. As shown, the artifact-identification component 110 may sample the image 402 next, which is associated with the second level, using the processes described herein to generate an image 412, which is associated with a third level. For instance, the artifact-identification component 110 may sample an area 414(1) of the image 402 that includes pixels 416(1)-(4) (also referred to singularly as "pixel 416" or in plural as "pixels 416"). Based on the sampling, the artifact-identification component 110 may determine that the area 414(1) represents a true color edge 418 (e.g., the color range associated with color values of the pixels 416 is equal to or greater than a threshold color value). As such, the artifact-identification component 110 may determine a color value for a pixel 420(1) associated with the image 412 that corresponds to the area 414(1) of the image 402. As described herein, the artifact-identification component 110 may determine the color value as including the marker value, such as the negative value (e.g., −2.0).

Because of this, the pixel 420(1) may include a specific color associated with the marker value. In the example of FIG. 4B, the specific color is again black. However, in other examples, the specific color may include any other color.

The artifact-identification component 110 may also perform similar processes to sample an area 414(2) of the image 402 that includes pixels 416(3) and 422(1)-(3). Based on the sampling, the artifact-identification component 110 may determine that the area 414(2) represents an artifact (e.g., the color range associated with the color values of the pixels 416(3) and 422(1)-(3) is less than the threshold color value). The artifact-identification component 110 may then determine a color value for a pixel 420(2) associated with the image 412 that corresponds to the area 414(2) of the image 402. As described herein, since the area 414(2) depicts an artifact, the artifact-identification component 110 may determine the color value using the color values of the pixels 416(3) and 422(1)-(3). For instance, in some examples, the artifact-identification component 110 may determine that the color value of the pixel 420(2) includes the average of the color values of the pixels 416(3) and 422(1)-(3). However, in other examples, the artifact-identification component 110 may determine the color value of the pixel 420(2) using one or more additional and/or alternative techniques.

The artifact-identification component 110 may continue to perform these processes of sampling additional areas of the image 402 to generate the image 404. In the example of FIG. 4B, since each of the pixels of the image 402 are sampled twice using groups that include four pixels, the image 412 may be half of the size of the image 402. For instance, and as shown, the width of the image 412 is the same as the width of the image 402, but the height of the image 412 is half of the height of the image 402. However, in other examples, the artifact-identification component 110 may sample the image 402 using one or more other processes such that the height of the image 412 is the same as the height of the image 402, but the width of the image 412 is half of the width of the image 402. Additionally, in other examples, the artifact-identification component 110 may sample the image 402 using one or more other processes such that the size of the image 412 is 25% of the size of the image 402, 75% of the size of the image 402, and/or any other percentage of the size of the image 402.

By performing the processes described herein, areas 424(1)-(3) of the image 412 that are associated with areas of the image 212—for which the true color edges 418 are located—will include a specific color (e.g., black in the example of FIG. 4B). Additionally, the remaining areas of the image 412 that are associated with areas of the image 202 that do not include true color edges 418 and/or include artifacts will include a color that is based on color values of the pixels of the image 202.

As further illustrated by the examples of FIGS. 4A-4B, the widths of the areas 414 sampled for the image 412 (e.g., in the horizontal direction) are twice as large as the widths of the areas 302(2) and 406 sampled for the image 402 (e.g., in the horizontal direction). In some examples, the widths of the areas of images that are sampled may continue to double in size for each forward pass that is performed by the artifact-identification component 110 (e.g., at each level of the forward pass). By increasing the widths of the samples at each forward pass, the artifact-identification component 110 may ensure that an entirety of the original image 202 is sampled in the horizontal direction. In some examples, it is important to sample larger areas of the image 202, at least in the horizontal direction, since artifacts may span multiple pixels (e.g., one hundred pixels) in the horizontal direction of the image 202. As such, these artifacts may only be identified by the artifact-identification component 110 by sampling larger areas of the image 202.

In some examples, the artifact-identification component 110 may use the same threshold color value for each forward pass (e.g., for each level) when identifying artifacts and/or true color edges. However, in other examples, the artifact-identification component 110 may use different threshold color values for one or more of the forward passes. For example, the artifact-identification component 110 may use a first threshold color value for one or more forward passes (e.g., the first and second forward passes), a second threshold color value for one or more forward passes (e.g., the third and fourth forward passes), and/or so forth. In some examples, the artifact-identification component 110 may increase the threshold color values as the artifact-identification component 110 progresses through the forward passes, such as to identify artifacts during times of low bandwidth. However, in other examples, the artifact-identification component 110 may decrease the threshold color values as the artifact-identification component 110 progresses through the forward passes.

Referring back to the example of FIG. 1, in some examples, the artifact-identification component 110 may continue to perform these processes using one or more additional forward passes to continue creating new images. In some examples, the images created by the artifact-identification component 110 may be associated with one or more of the image buffers 112. For example, the original image 202 may be associated with a first image buffer 112 (e.g., an input image buffer), the image 402 associated with the first forward pass may be associated with a second image buffer 112 (e.g., a first working buffer), the image 412 associated with the second forward pass may be associated with a third image buffer 112 (e.g., a second working buffer), and/or so forth.

In some examples, each of the images in the forward pass may be associated with a respective resolution. For instance, the original image 202 may be associated with a first resolution, the image 402 associated with the first forward pass may be associated with a second resolution, the image 412 associated with the third forward pass may be associated with a third resolution, and/or so forth. In some examples, each of the resolutions may include the same resolution. In other examples, one or more of the resolutions may differ from one or more other resolutions. For instance, the first resolution may include the highest resolution, followed by the second resolution, followed by the third resolution, and/or so forth. In such examples, the resolutions may be reduced by half with each forward pass.

The process 100 may include an artifact-correction component 114 performing a series of backward passes, using one or more of the images created by the artifact-identification component 110, to determine new pixel values for the original input image. In some examples, the number of backward passes performed by the artifact-correction component 114 may be the same as the number of forward passes that were performed by the artifact-identification component 110. In other examples, the number of backward passes performed by the artifact-correction component 114 may be different than (e.g., more or less than) the number of forward passes that were performed by the artifact-identification component 110. Still, in some examples, the artifact-correction component 114 begins the series of backward passes using the last image generated by the artifact-identification component 110 (e.g., the highest-level image).

The artifact-correction component 114 may perform the series of backward passes using a set of image buffers 112. Similar to the image buffers 112 used for the series of forward passes, the set of image buffers 112 may have the same width as the original image, but the heights of the image buffers 112 may change based on where in the series of backward passes the image buffer 112 is associated. For example, a first image buffer 112 (e.g., a last working buffer) associated with the first backward pass may include a first height, a second image buffer 112 (e.g., a second to last working buffer) associated with the second backward pass may include a second height that is greater than (e.g., double) the first height, a third image buffer 112 (e.g., a third to last working buffer) that is associated with the third backward pass may include a third height that is greater than (e.g., double) the second height, and/or so forth to a last image buffer that is associated and/or includes a same size as the original image. In some examples, the image buffers 112 associated with the backward passes are the same as the image buffers 112 associated with the forward passes. In other examples, the image buffers 112 associated with the backward passes are different than the image buffers 112 associated with the forward passes.

For a backward pass, the artifact-correction component 114 may sample a number of points of a higher-level image, such as two points. For example, and as described above, each pixel of an image during a forward pass may be processed to determine color values for two pixels in the higher-level image. As such, in the backward pass, the same two pixels that were determined for the forward pass may be sampled to determine a new color value for the pixel in the lower-level image. To determine the color value, if the two pixels are not associated with a marker value, then the color values for the two pixels are used to determine the new color value for the pixel in the other image. In some examples, the new color value is determined by averaging the two color values. However, if at least one of the two pixels is associated with a marker value, then the original color value for that pixel(s) in the other lower-level image is used to determine the new color value. For instance, the new color value may again be determined by averaging the original color value of the pixel that is associated with the marker value and the color value of the other pixel in the sample. The artifact-correction component 114 may then perform similar processes for additional pixel groups.

For instance, the artifact-correction component 114 may sample pixels using the following:

$$\text{(for each } xx, yy, \text{ texture coordinate)}$$

$$\text{int } xx1 = xx;$$

$$\text{int } o1 = (xx1 \gg \text{level}) \,\&1;$$

$$\text{int } yy1 = (yy + o1) \gg 1;$$

$$\text{int } xx2 = xx - (2 \ll \text{level});$$

$$\text{int } o2 = 1 - o1;$$

$$\text{int } yy2 = (yy + o2) \gg 1;$$

In the above, the artifact-correction component 114 may sample at (xx1, yy1) and (xx2, yy2).

For instance, FIG. 5A illustrates an example of performing a first backward pass, in accordance with some embodiments of the present disclosure. As shown, for the first backward pass, the artifact-correction component 114 may sample at least the pixels 420(1)-(2) from the image 412 that are associated with the pixel 416(3) from the image 402. For instance, and as described in the example of FIG. 4B, the pixel 416(3) was included in each of the samples that were used to determine the color values for each of the pixels 420(1)-(2). In the example of FIG. 5A, the pixel 420(1) may be associated with a color value that includes the marker value while the pixel 420(2) is associated with a real color value. In some examples, based on the pixel 420(1) being associated with the marker value, the artifact-correction component 114 may determine a new color value associated with the pixel 420(1) that includes the original color value of the pixel 416(3). The artifact-correction component 114 may then determine the new color value for the pixel 416(3) using the original color value for the pixel 416(3) and the color value of the pixel 420(2). For example, the artifact-correction component 114 may determine the new color value for the pixel 416(3) as the average of the original color value for the pixel 416(3) and the color value of the pixel 420(2).

In other examples, based on the pixel 420(1) being associated with the marker value, the artifact-correction component 114 may determine that the new color value for the pixel 416(3) includes the original color value for the pixel 416(3) (which may still be the same as the averaging described above). In other words, since the pixel 416(3) is associated with a true color edge, the color value associated with the pixel 416(3) should remain approximately the same.

The artifact-correction component 114 may also sample pixels 502(1)-(2) (also referred to singularly as "pixel 502" or in plural as "pixels 502") from the image 412 that are associated with a pixel 504 from the image 402. For instance, the pixel 504 may have been included in each of the samples that were used to determine the color values for each of the pixels 502 during the forward pass. In the example of FIG. 5A, both of the pixels 502 are associated with real color values. As such, the artifact-correction component 114 may determine a new color value for the pixel 504 using the real color values of the pixels 502. For example, the artifact-correction component 114 may determine the new color value for the pixel 504 as the average of the real color values for the pixels 502. The artifact-correction component 114 may continue to perform these processes to determine new color values for the pixels of the image 402.

FIG. 5B illustrates an example of performing a second backward pass, in accordance with some embodiments of the present disclosure. As shown, for the second backward pass, the artifact-correction component 114 may sample at least the pixels 404(1)-(2) from the image 402 that are associated with the pixel 306(3) from the image 202. For instance, and as described in the example of FIG. 4A, the pixel 306(3) was included in each of the samples that were used to determine the color values for each of the pixels 404(1)-(2). In the example of FIG. 5B, the pixel 404(1) may be associated with a color value that includes the marker value while the pixel 404(2) is associated with a real color value. In some examples, based on the pixel 404(1) being associated with the marker value, the artifact-correction component 114 may determine a new color value associated with the pixel 404(1) that includes the original color value of the pixel 306(3). The artifact-correction component 114 may then determine the new color value for the pixel 306(3) using the original color value for the pixel 306(3) and the real color value of the pixel 404(2). For example, the artifact-correction component 114 may determine the new color value for the pixel 306(3) as the average of the original color value for the pixel 306(3) and the real color value of the pixel 404(2).

In other examples, based on the pixel 404(1) being associated with the marker value, the artifact-correction component 114 may determine that the new color value for the pixel 306(3) includes the original color value for the pixel 306(3) (which may still be the same as the averaging described above). In other words, since the pixel 306(3) is associated with a true color edge, the color value associated with the pixel 306(3) should remain approximately the same.

The artifact-correction component 114 may also sample pixels 404(2) and 506 from the image 402 that are associated with a pixel 508 from the image 202. For instance, the pixel 508 may have been included in each of the samples that were used to determine the color values for each of the pixels 404(2) and 506 during the forward pass. In the example of FIG. 5B, both of the pixels 404(2) and 506 are associated with real color values. As such, the artifact-correction component 114 may determine a new color value for the pixel 508 using the real color values of the pixels 404(2) and 506. For example, the artifact-correction component 114 may determine the new color value for the pixel 508 as the average of the real color values for the pixels 404(2) and 506. The artifact-correction component 114 may then continue to perform these processes to determine new color values for the pixels of the image 202.

In some examples, each of the images in the backward pass may be associated with a respective resolution. For instance, the image 412 may be associated with a first resolution, the image 402 associated with the first backward pass may be associated with a second resolution, the image 202 associated with the third backward pass may be associated with a third resolution. In some examples, each of the resolutions may include the same resolution. In other examples, one or more of the resolutions may differ from one or more other resolutions. For instance, the first resolution may include the lowest resolution, the second resolution may include the second lowest resolution, and the third resolution may include the third lowest resolution. In such an example, the resolution of the images may double with each backward pass.

Referring back to the example of FIG. 1, once the artifact-correction component 114 has finished performing the series of backward passes, the output from the artifact-correction component 114 may include pixel values for the original image. In some examples, such as in areas of the original image that are associated with true color edges, the pixel values may be the same as and/or substantially similar to the original color values of the pixels. Additionally, in some examples, such as in areas of the original image that are associated with artifacts, the pixel values may be different than the original color values. The client device 106 may then perform one or more additional processes on the image.

For example, after performing the multi-pass processing, at least some of the color values associated with at least some of the pixels may include fractions. As such, the process 100 may include a dithering component 116 that processes the image using one or more dithering techniques. For instance, the dithering component 116 may process the image by applying noise that is used to randomize the quantization error, where randomizing the quantization error may remove at least some of the artifacts (e.g., the artifacts 204) within the image. To perform the dithering, the dithering component 116 may use one or more algorithms associated with the one or more dithering techniques, such as thresholding dithering, random dithering, patterning dithering, ordered dithering, error-diffusion dithering, and/or any other type of dithering. For example, the dithering component 116 may perform dithering using the following algorithms:

(for each $xx$, $yy$, texture coordinate)

int dither = $(xx \gg 1)$ &1) + $((yy)$ &2) + $((yy \ll 2)$ &4) + $((xx \ll 3)$ &8);

float $fdither$ = (float $(m)$ + 0.5) $*$ 0.000245098;

// divide by 16 $*$ 255

The process 100 may include an output component 118 that outputs the image. For example, the output component 118 may include a display of the client device 106 that presents the image, such as to one or more users. In some examples, the client device 106 may then continue to perform the processes described herein to continue processing images represented by the image data 104 for output.

In some examples, one or more parameters associated with the processing described herein may be updated based on one or more events. The parameter(s) may include, but is not limited to, the number of passes (e.g., the number of levels), the threshold color value(s), and/or the like. In some examples, the parameter(s) may be updated based on receiving input from a user to customize the parameter(s). In some examples, the parameter(s) may automatically be updated based on certain conditions, such as network conditions and/or computing resources.

For example, if the network conditions change, such as the bit rate decreases based on low bandwidth, then one or more of the threshold color values used to identify artifacts and/or true color edges may be increased. Additionally, if the network conditions again change, such as the bit rate increasing based on higher bandwidth, then one or more of the threshold color values used to identify artifacts and/or true color edges may be decreased. In such an example, the threshold color value(s) may increase when the bit rate decreases since the artifacts will likely be larger. As such, increasing the threshold color value(s) will cause the artifact-identification component 110 to still identify these artifacts within the image(s). Additionally, the threshold color value(s) may decrease when the bit rate increases since the artifacts will likely be smaller. As such, decreasing the threshold color value(s) will cause the artifact-identification component 110 to still detect these artifacts within the image(s) without wrongfully identifying a true color edge as an artifact.

In some examples, the client device 106 may receive, from the application server(s) 102, processing data 120 representing information associated with how the application server(s) 102 processed the image data 104 before sending the image data 104 to the client device 106. For example, the processing data 120 may represent at least the bit rate that the application server(s) 102 used for the image data 104 and/or other types of quantization parameters. In examples where the application server(s) 102 sends the processing data 120 along with the image data 104, the client device 106 may use the processing data 120 to update the parameter(s).

Figure 9:
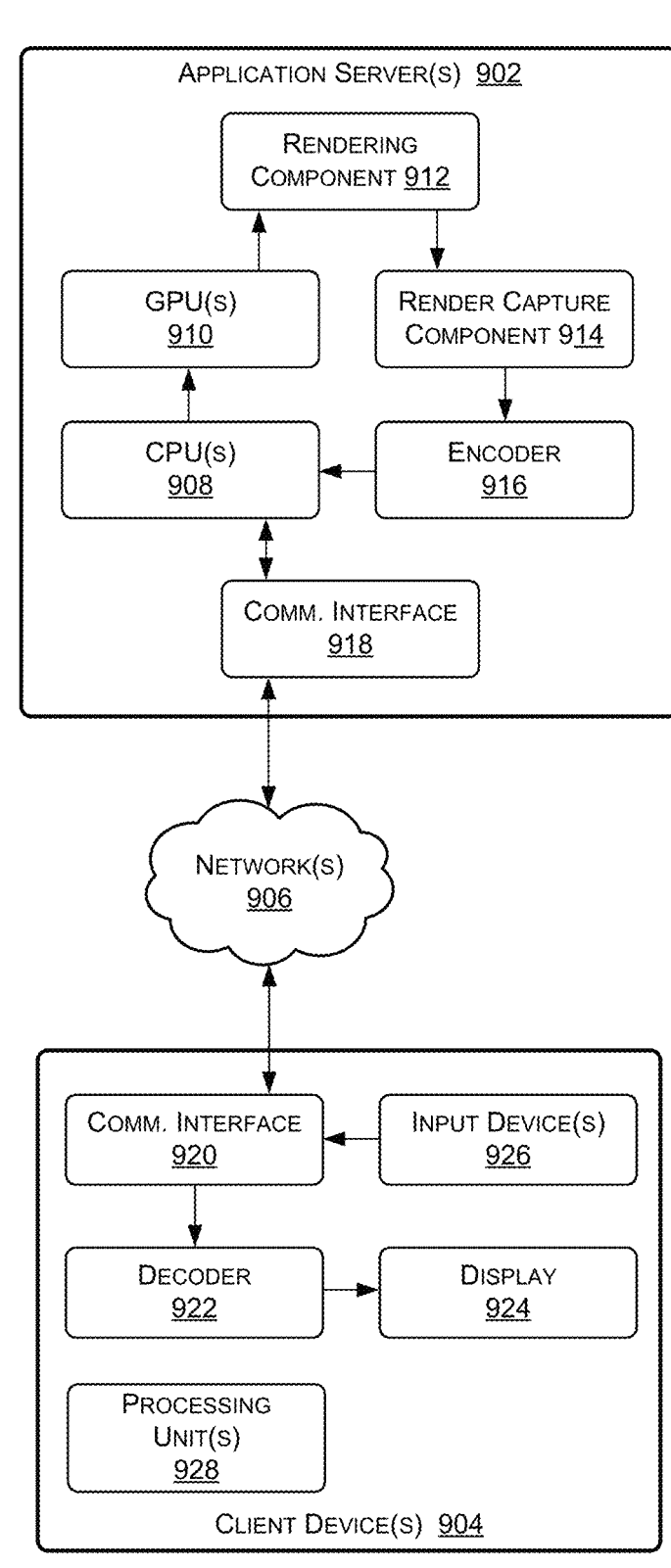
FIG. 9 is a block diagram of an example content streaming system suitable for use in implementing some embodiments of the present disclosure.

In some examples, the client device 106 may include one or more processing units (e.g., a processing unit(s) 928 from FIG. 9), such as one or more graphics processing units or one or more hardware accelerators, that are configured to perform at least some of the processes described herein. In some examples, the client device 106 may perform one or more additional processes to process the image data 104. For example, the client device 106 may convert the image data 104, after processing, from a first color space to a second color space. For instance, the client device 106 may convert the image data 104, after processing, from the RGB color space to the YUV color space or convert the image data 104 from the YUV color space to the RGB color space. In some examples, the client device 106 may convert the image data 104 to the new color space based on the color space that the output component 118 uses to present the image(s).

While the example of FIG. 1 illustrates the client device 106 as processing the image data 104, in other examples, the application server(s) 102 may perform at least some of the processing described herein with respect to the client device 106. For example, the application server(s) 102 may include one or more of the artifact-identification component 110, the artifact-correction component 114, and/or the dithering component 116. The application server(s) 102 may then send the image data 104, as processed, to the client device 106.

Now referring to FIGS. 6-8, each block of methods 600-800, described herein, comprises a computing process that may be performed using any combination of hardware, firmware, and/or software. For instance, various functions may be carried out by a processor executing instructions stored in memory. The methods 600-800 may also be embodied as computer-usable instructions stored on computer storage media. The methods 600-800 may be provided by a standalone application, a service or hosted service (standalone or in combination with another hosted service), or a plug-in to another product, to name a few. In addition, the method 600-800 are described, by way of example, with respect to the system of FIG. 1. However, the methods 600-800 may additionally or alternatively be executed by any one system, or any combination of systems, including, but not limited to, those described herein.

FIG. 6 is a flow diagram showing a method 600 for processing an image to remove an artifact, in accordance with some embodiments of the present disclosure. The method 600, at block B602, may include receiving image data representing a first image. For instance, the client device 106 may receive the image data 104 from the application server(s) 102, wherein the image data 104 represents the first image. In some examples, the application server(s) 102 may have processed the image data 104 before sending, such as by using one or more dithering techniques to remove one or more artifacts from the first image. However, the application server(s) 102 may have then compressed the image data 104, which may have removed at least some of the effects from the one or more dithering techniques.

The method 600, at block B604, may include determining, based at least on one or more first color values associated with an area of the first image, that the area of the first image is associated with an artifact. For instance, the client device 106 may sample the area of the first image. To sample the area, the client device 106 may determine first values for first pixels included in the area. The client device 106 may then determine that the area depicts the artifact using the first color values. For instance, in some examples, the client device 106 may determine a color range associated with the first color values, such as by taking a difference between the lowest color value and the highest color value. The client device 106 may then determine that the color range is less than a threshold color value. Based on the determination, the client device 106 may determine that the area depicts an artifact, such as "banding" or "false contouring."

The method 600, at block B606, may include generating second image data representing a second image, an area of the second image data being associated with one or more second color values that are determined using the one or more first color values based at least on the area of the first image being associated with the artifact. For instance, the client device 106 may perform a forward pass, using the first image data, to generate the second image data representing the second image. For example, based on the area of the first image being associated with the artifact, the client device 106 may determine the one or more second color values using the first color values. In some examples, the client device 106 determines the one or more second color values as the average of the first color values. The client device 106 may then associate the one or more second color values with one or more second pixels associated with the area of the second image.

The method 600, at block B608, may include generating third image data representing a third image, an area of the third image being associated with one or more third color values that are determined based at least on the one or more second color values. For instance, the client device 106 may perform a backward pass, using the second image data, to generate the third image data representing the third image. For example, the client device 106 may sample second pixels associated with the area of the second image. Based on the sampling, the client device 106 may determine second color values associated with the second pixels and then use the second color values to determine at least a third color value for a third pixel associated with the area of the third image. In some examples, the client device 106 determines the third color value as the average of the second color values. The client device 106 may then perform similar processes to determine additional color values for additional pixels of the third image.

The method 600, at block B610, may include causing output of the third image. For instance, the client device 106 may display the third image, such as to one or more users. In some examples, the client device 106 may then continue to perform the method 600 to generate one or more additional images for display. For instance, the images may be associated with a game stream.

FIG. 7 is a flow diagram showing a method 700 for sampling an area of an image during a forward pass to identify an artifact, in accordance with some embodiments of the present disclosure. The method 700, at block B702, may include identifying pixels associated with an area of an image. For instance, the client device 106 may sample the image to identify the area, where the pixels are located within the area. In some examples, the pixels include four pixels arranged in a square and/or rectangular patter. In other examples, the pixels include any number of pixels arranged in any other type of pattern.

The method 700, at block B704, may include determining color values associated with the pixels. For instance, the client device 106 may then determine the color values associated with the pixels. The color values may be associated with the RGB color space, the YUV color space, and/or any other color space. In some examples, the color values are associated with a single component of the color space. For a first example, and in the RGB color space, the color values may include the red components, the green components, or the blue components. For a second example, in the YUV space, the color values may be associated with the luminance components, the blue projection components, or the red projection components. In some examples, the color values are associated with more than one component of the color space. For a first example, and in the RGB color space, the color values may include two or more of the red components, the green components, or the blue components. For a second example, in the YUV space, the color values may be associated with two or more of the luminance components, the blue projection components, or the red projection components.

The method 700, at block B706, may include determining a color range value associated with the color values. For instance, the client device 106 may determine the color range value using the color values, such as by taking the difference between the lowest color value and the highest color value. In some examples, such as when the color values are associated with a single component of the color space, the client device 106 may determine a single color range value. For a first example, and in the RGB color space, the color range value may be determined based on the red components, the green components, or the blue components. For a second example, in the YUV space, the color range value may be determined based on the luminance components, the blue projection components, or the red projection components. In some examples, such as when the color values are associated with more than one component of the color space, the client device 106 may determine multiple color range values. For a first example, and in the RGB color space, two or more color range values may be determined using two or more of the red components, the green components, or the blue components. For a second example, in the YUV space, two or more color range values may be determined using two or more of the luminance components, the blue projection components, or the red projection components.

The method 700, at block B708, may include determining whether the color range value is less than a threshold color value. For instance, the client device 106 may compare the color range value to the threshold color value. In some examples, such as when the client device 106 determines multiple color range values, the client device 106 may compare each of the color range values to one or more threshold color values. Based on the comparison, the client device 106 may determine whether the color range value(s) is less than the threshold color value(s).

If, at block B708, it is determined that the color range value is less than the threshold color value, then the method 700, at block B710, may include determining that the area is associated with an artifact. For instance, if the client device 106 determines that the color range value is less than the threshold color value (and/or that one or more of the color range values is less than one or more threshold color values), then the client device 106 may determine that the area is associated with the artifact. The method 700 may then include, at block B710, determining a pixel value for a pixel of a second image based at least on the pixel values. For instance, the client device 106 may then use the pixel values to determine the pixel value for the pixel of the second image, such as including an average of the pixel values.

However, if, at block B708, it is determined that the color range value is equal to or greater than the threshold color value, then the method 700, at block B714, may include determining that the area is associated with a true color edge. For instance, if the client device 106 determines that the color range value is equal to or greater than then threshold color value (and/or that the color range values are equal to or greater than one or more threshold color values), then the client device 106 may determine that the area is associated with the true color edge. The method 700 may then include, at block B716, determining the pixel value for the pixel of the second image as a marker pixel value. For instance, the client device 106 may then determine the pixel value for the pixel of the second image to include the marker pixel value.

FIG. 8 is a flow diagram showing a method 800 for sampling an area of an image during a backward pass to correct an artifact, in accordance with some embodiments of the present disclosure. The method 800, at block B802, may include identifying pixels associated with a first image. For instance, during a backward pass, the client device 106 may sample the first image to identify the pixels. As described herein, the client device 106 may identify the pixels based on color values associated with the pixels being determined using the same color value from the same pixels in a second image during a forward pass.

The method 800, at block B804, may include determining first color values associated with the first pixels. For instance, the client device 106 may then determine the first color values associated with the pixels. The first color values may be associated with the RGB color space, the YUV color space, and/or any other color space. In some examples, the first color values are associated with a single component of the color space. For a first example, and in the RGB color space, the first color values may include the red components, the green components, or the blue components. For a second example, in the YUV space, the first color values may be associated with the luminance components, the blue projection components, or the red projection components. In some examples, the first color values are associated with more than one component of the color space. For a first example, and in the RGB color space, the first color values may include two or more of the red components, the green components, or the blue components. For a second example, in the YUV space, the first color values may be associated with two or more of the luminance components, the blue projection components, or the red projection components.

The method 800, at block B806, may include determining whether one of the first color values is a marker color value. For instance, the client device 106 may determine whether at least one of the first color values is the marker color value. As described herein, the marker color value may include a color value that is outside of the color space. For example, the marker color value may include a negative value.

If, at block B806, it is determined that the first color values are not associated with the marker color value, then the method 800, at block B808, may include determining a color value for a pixel of a second image based at least on the first color values. For instance, if the client device 106 determines that the first color values are not associated with the marker color values, then the client device 106 may determine the color value for the pixel using the first color values. In some examples, the client device 106 determines the color value as the average of the first color values. In some examples, such as when the color values are associated with multiple components of the color space, the client device 106 may determine each of the components of the color value for the pixel.

However, if, at block B806, it is determined that at least one of the first color values is associated with the marker color value, then the method 800, at block B810, may include determining one or more second color values. For instance, if the client device 106 determines that at least one of the first color values is associated with the marker color values, then the client device 106 may determine the one or more second color values. In some examples, the client device 106 determines the one or more second color values using the color value of the pixel from the second image that was used to determine the first color values of the first pixels.

The method 800, at block B812, may include determining the color value for the pixel of the second image based at least on the one or more second color values. For instance, the client device 106 may determine the color value for the pixel using the one or more second color values. In some examples, the client device 106 determines the color value for the pixel as the average of the one or more second color values. In some examples, the client device 106 determines the color value for the pixel as one of the one or more second color values.

Example Content Streaming System

Now referring to FIG. 9, FIG. 9 is an example system diagram for a content streaming system 900, in accordance with some embodiments of the present disclosure. FIG. 9 includes application server(s) 902 (which may include similar components, features, and/or functionality to the example computing device 1000 of FIG. 10), client device(s) 904 (which may include similar components, features, and/or functionality to the example computing device 1000 of FIG. 10), and network(s) 906 (which may be similar to the network(s) described herein). In some embodiments of the present disclosure, the system 900 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 900, for an application session, the client device(s) 904 may only receive input data in response to inputs to the input device(s), transmit the input data to the application server(s) 902, receive encoded display data from the application server(s) 902, and display the display data on the display 924. As such, the more computationally intense computing and processing is offloaded to the application server(s) 902 (e.g., rendering—in particular ray or path tracing—for graphical output of the application session is executed by the GPU(s) of the game server(s) 902). In other words, the application session is streamed to the client device(s) 904 from the application server(s) 902, thereby reducing the requirements of the client device(s) 904 for graphics processing and rendering.

For example, with respect to an instantiation of an application session, a client device 904 may be displaying a frame of the application session on the display 924 based on receiving the display data from the application server(s) 902. The client device 904 may receive an input to one of the input device(s) and generate input data in response. The client device 904 may transmit the input data to the application server(s) 902 via the communication interface 920 and over the network(s) 906 (e.g., the Internet), and the application server(s) 902 may receive the input data via the communication interface 918. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 912 may render the application session (e.g., representative of the result of the input data) and the render capture component 914 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 902. In some embodiments, one or more virtual machines (VMs)—e.g., including one or more virtual components, such as vGPUs, vCPUs, etc.—may be used by the application server(s) 902 to support the application sessions. The encoder 916 may then encode the display data to generate encoded display data and the encoded display data may be transmitted to the client device 904 over the network(s) 906 via the communication interface 918. The client device 904 may receive the encoded display data via the communication interface 920 and the decoder 922 may decode the encoded display data to generate the display data. The client device 904 may then display the display data via the display 924.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, image processing, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing image processing, and/or other types of systems.

Example Computing Device

Figure 10:
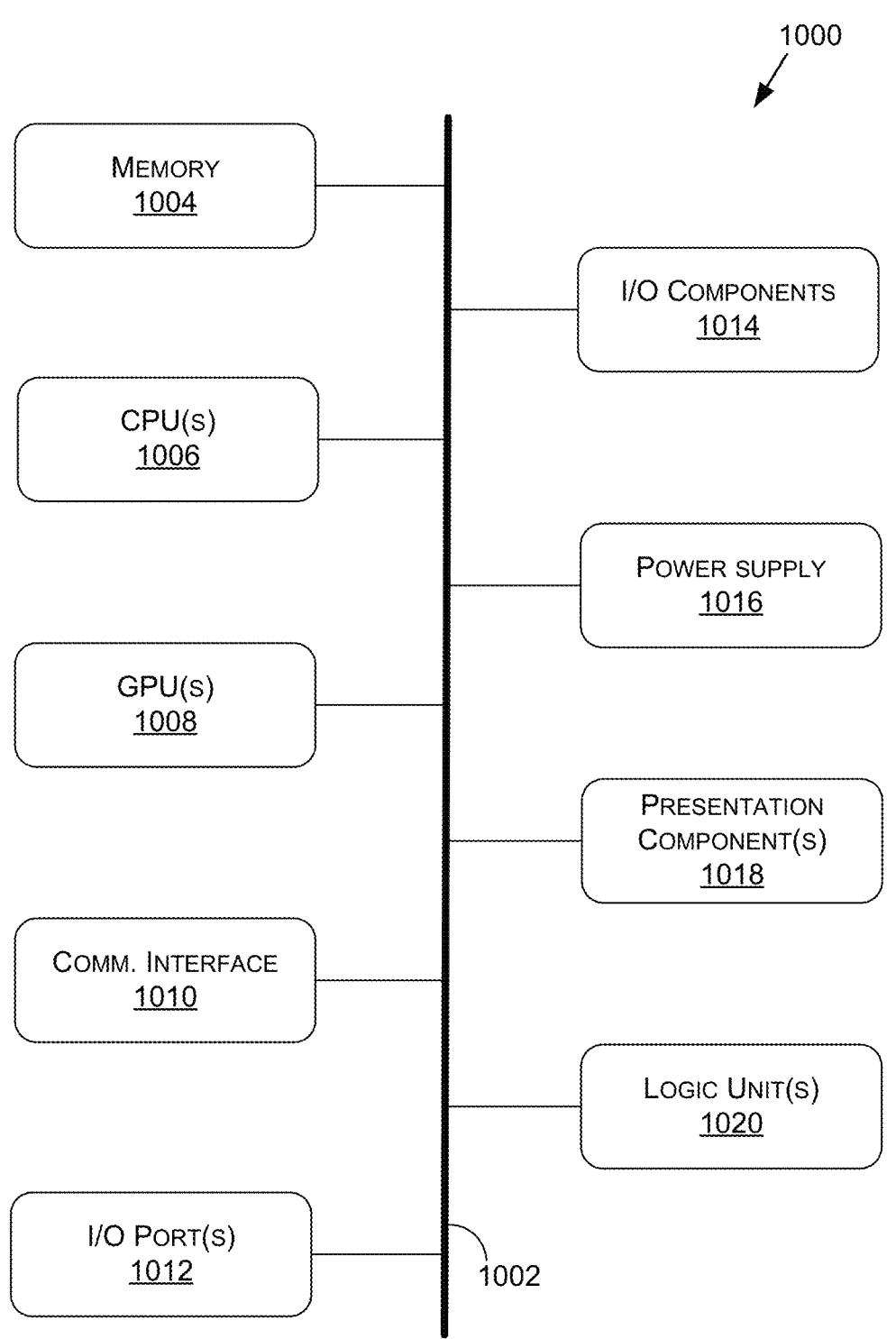
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
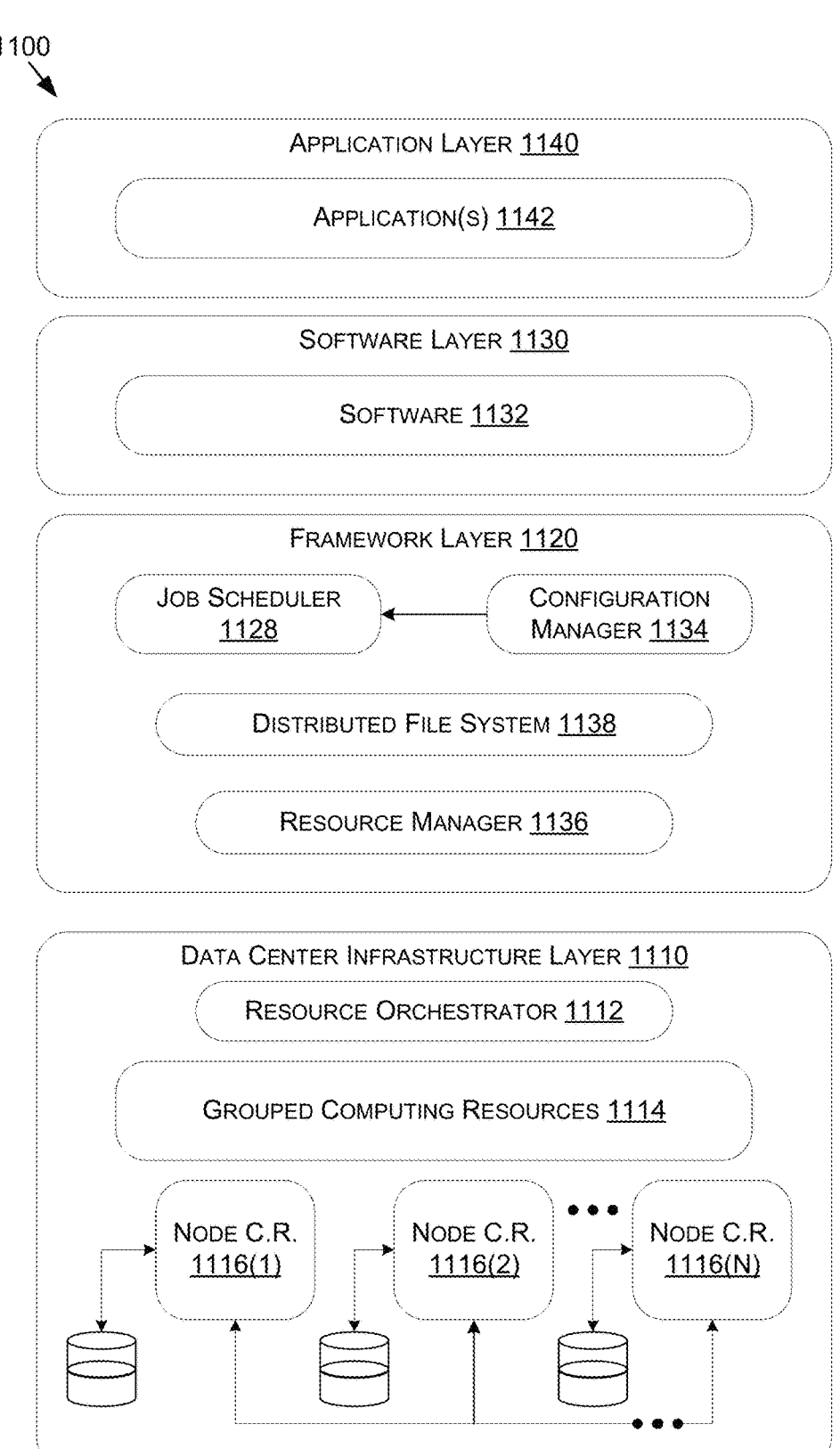
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1128, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1128 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1128. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
determining at least one area of a first image is associated with an artifact based at least on first color values associated with first pixels corresponding to the at least one area of the first image;
generating, based at least on first image data representing the first image, second image data representing a second image, individual second color values associated with individual second pixels of the second image being determined by averaging respective portions of the first color values the first pixels;
generating, based at least on the second image data, third image data representing a third image, at least one or more third color values associated with at least a third pixel of the third image determined by at least averaging the second color values of the second pixels, the third pixel of the third image corresponding to a first pixel from the first pixels of the first image; and
causing output of the third image.

2. The method of claim 1, wherein the determining the at least one area of the first image is associated with the artifact comprises:
determining a color range value based at least on at least a portion of the first color values; and
determining that the color range value is less than a threshold color value.

3. The method of claim 1, wherein:
the method further comprises determining, based at least on the respective portions of the first color values, the individual second color values associated with the individual second pixels of the second image.

4. The method of claim 1, further comprising:
determining, based at least on one or more fourth color values associated with a second area of the first image, that the second area of the first image is associated with a color edge; and
determining, based at least on the second area of the first image being associated with the color edge, that one or more fifth color values associated with the second image include one or more marker color values.

5. The method of claim 4, wherein the determining that the second area of the first image is associated with the color edge comprises:
determining a color range value based at least on the one or more fourth color values associated with the second area of the first image; and
determining that the color range value is equal to or greater than a threshold color value.

6. The method of claim 4, wherein:
the one or more fourth color values are associated with a fourth pixel corresponding to the second area of the first image;

the one or more fifth color values include at least a marker color value, of the one or more marker color values, associated with a fifth pixel of the second image; and the method further comprising determining, based at least on the marker color value, that one or more sixth color values associated with a sixth pixel of the third image includes the one or more fourth color values associated with the fourth pixel, the sixth pixel of the third image corresponding to the fourth pixel of the first image.

7. The method of claim 1, further comprising:

determining, based at least on averaging the second color values, one or more fourth color values associated with the third image; and determining the one or more third color values by applying one or more dithering operations to the one or more fourth color values.

8. The method of claim 1, wherein:

the first image data is associated with a first image buffer that includes a first width and a first height; and the second image data is associated with a second image buffer that includes a second width and a second height, wherein at least one of the first width is different than the second width or the first height is different than the second height.

9. The method of claim 1, wherein:

the first image data is associated with a first resolution;

the second image data is associated with a second resolution that is less than the first resolution; and the third image data is associated with a third resolution that is at least one of greater than the second resolution or a same resolution as the first resolution.

10. A device comprising:

one or more processors to:

determine, based at least on one or more color values associated with one or more first pixels corresponding to at least one area of a first image, that the at least one area of the first image is associated with a color edge;

determine, based at least on the at least one area of the first image being associated with the color edge, that one or more second pixels of a second image are associated with one or more marker color values;

determine, based at least on the one or more marker color values associated with the one or more second pixels, that one or more third pixels of a third image are associated with the one or more color values, the one or more third pixels of the third image corresponding to the one or more first pixels of the first image; and cause output of the third image.

11. The device of claim 10, wherein the determination that the at least one area of the first image is associated with the color edge comprises:

determining a color range value based at least on the one or more color values; and determining that the color range value is equal to or greater than a threshold color value.

12. The device of claim 10, wherein the one or more marker color values are outside of color values corresponding to a color space associated with the second image.

13. The device of claim 10, wherein the one or more processors are further to:

determine, based at least on one or more second color values associated with a second area of the first image, that the second area of the first image is associated with an artifact; and determine, based at least on the second area of the first image being associated with the artifact, one or more third color values using the one or more second color values, the one or more third color values being associated with the second image.

14. The device of claim 13, wherein the determination that the second area of the first image is associated with the artifact comprises:

determining a color range value based at least on the one or more second color values associated with the second area of the first image; and determining that the color range value is less than a threshold color value.

15. The device of claim 10, wherein the one or more processors are further to:

determine, based at least on the one or more marker color values, one or more second color values associated with the third image; and determine that the one or more third pixels are associated with the one or more color values by applying one or more dithering operations to the one or more second color values.

16. The device of claim 10, wherein the device is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

17. The device of claim 10, wherein the one or more processors are further to:

determine, based at least on the one or more color values, that one or more fourth pixels of the second image are associated with one or more second color values, wherein the one or more third pixels of the third image are further determined to be associated with the one or more color values based at least on the one or more second color values.

18. One or more processors comprising processing circuitry to:

determine that a first area of a first image is associated with an artifact based at least on a first portion of first color values that are associated with the first area of the first image and a second area of the first image is associated with a color edge based at least on a second portion of the first color values that are associated with the second area of the first image;

determine, based at least on the first area of the first image being associated with the artifact, a first portion of second color values associated with a second image using the first portion of the first color values;

determine, based at least on the second area of the first image being associated with the color edge, a second portion of the second color values using a set color value;

determine, based at least on the first area of the first image being associated with the artifact, a first portion of third color values associated with a third image using the first portion of the second color values determine, based at least on the second area of the first image being associated with the color edge, a second portion of the third color values using the second portion of the first color values; and cause output of the third image.

19. The one or more processors of claim 18, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

20. The one or more processors of claim 18, wherein:

the first area of the first image is associated with the artifact based at least on the first portion of the first color values including a first color range value that is less than a threshold color value; and the second area of the first image is associated with the color edge based at least on the second portion of the first color values including a second color range value that is equal to or greater than the threshold color value.

\* \* \* \* \*